United States Patent
Azizi et al.

(10) Patent No.: US 8,848,841 B2
(45) Date of Patent: Sep. 30, 2014

(54) TECHNIQUES TO ACCOMMODATE DIFFERENT CLASSES OF DEVICES IN A WIRELESS NETWORK

(71) Applicants: Shahrnaz Azizi, Portland, OR (US); Thomas J. Kenney, Portland, OR (US); Eldad Perahia, Portland, OR (US)

(72) Inventors: Shahrnaz Azizi, Portland, OR (US); Thomas J. Kenney, Portland, OR (US); Eldad Perahia, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/728,464

(22) Filed: Dec. 27, 2012

(65) Prior Publication Data

US 2014/0185656 A1    Jul. 3, 2014

(51) Int. Cl.
*H04L 27/06* (2006.01)
*H04B 1/10* (2006.01)

(52) U.S. Cl.
CPC ..................................... *H04B 1/109* (2013.01)
USPC ......................................................... 375/340

(58) Field of Classification Search
USPC ................................................. 375/219, 340
See application file for complete search history.

(56) References Cited

U.S. PATENT DOCUMENTS

| | | | |
|---|---|---|---|
| 8,223,893 | B1 | 7/2012 | Narasimhan |
| 2009/0147868 | A1* | 6/2009 | Ihm et al. ...................... 375/260 |
| 2011/0044408 | A1 | 2/2011 | Ahmad |
| 2011/0261739 | A1 | 10/2011 | Fong et al. |
| 2011/0305133 | A1 | 12/2011 | Feehtel |
| 2012/0051476 | A1* | 3/2012 | Shi et al. ........................ 375/359 |
| 2013/0232394 | A1* | 9/2013 | Ko et al. ......................... 714/776 |

FOREIGN PATENT DOCUMENTS

EP    2493109    8/2012

OTHER PUBLICATIONS

International Search Report and Written opinion received for PCT Patent Application No. PCT/US2013/048426, mailed Sep. 27, 2013, 10 pages.
"IEEE P802.11-11/1137r12", 802.11ah draft specification, Nov. 15, 2012 (Author unknown), 51 pages.

* cited by examiner

*Primary Examiner* — Don N Vo
(74) *Attorney, Agent, or Firm* — Kacvinsky Daisak Bluni PLLC

(57) ABSTRACT

An apparatus, a method and a machine-readable storage medium to accommodate both high function and low cost wireless devices in a wireless network. An exemplary apparatus includes a receiver to wirelessly receive a first packet comprising first and second shifting pilot signals amidst first data symbols transmitted via multiple subcarriers in symbol sets; a transmitter to wireless transmit a second packet; and logic to track a phase shift using the first and second shifting pilot signals, to configure the receiver to compensate for the shift in phase, to refrain from using reception of the first and second shifting pilot signals to update an initial channel estimate derived from a preamble of the first packet, and to transmit third and fourth shifting pilot signals amidst second data symbols of the second packet.

26 Claims, 11 Drawing Sheets

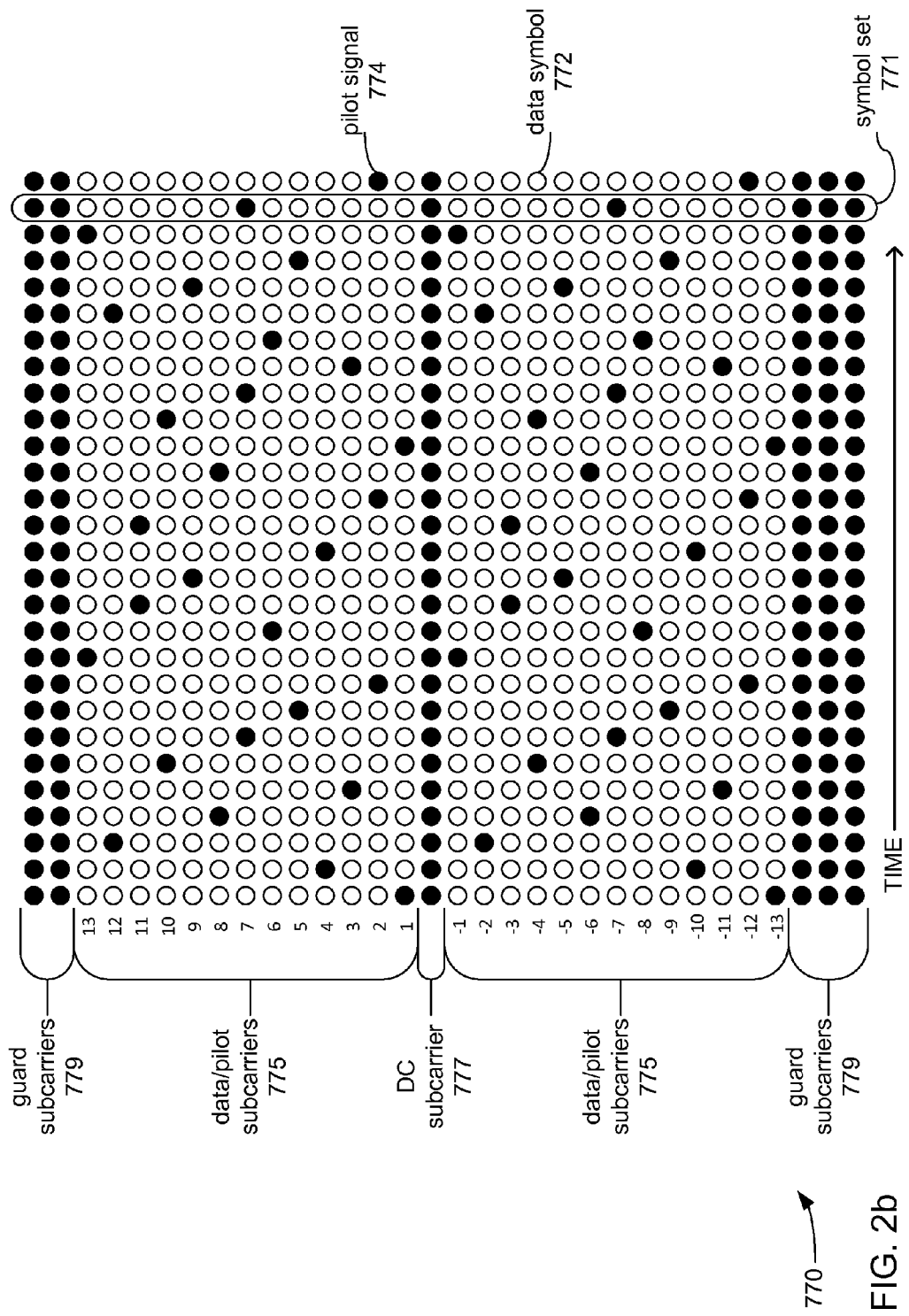

__US 8,848,841 B2__

TECHNIQUES TO ACCOMMODATE DIFFERENT CLASSES OF DEVICES IN A WIRELESS NETWORK

RELATED CASE

This application is related to commonly owned U.S. patent application Ser. No. 13/628,613, filed on Sep. 27, 2012 and entitled "Channel estimate and Tracking", the entirety of which is hereby incorporated by reference.

BACKGROUND

For some time, a general trend in development in wireless communications networks has been towards increasing transmission frequencies and increasing channel widths to enable increasing data rates to accommodate a continuing trend of using wireless devices of ever greater ranges of capability to exchange ever greater quantities of data. This trend has been seen among wireless wide area networks (WWANs), various variants of 3G and 4G cellular wireless networks, and wireless local area networks (WLANs).

With regard to WLANs, this trend can be observed in the development of the various 802.11 series standards promulgated by the Institute of Electrical and Electronics Engineers of New York, N.Y. over the last several years, including IEEE 802.11a/g, 802.11n, 802.11ac. However, in a recent shift, a new 802.11ah task group of the IEEE is currently developing a new variant of 802.11 series WLAN standard with comparatively lower data rates with narrower channels and transmissions at lower frequencies.

The lower transmission frequencies of 802.11ah are intended to enable greater range, and the narrower channels resulting in the lower data rates are meant to enable support for comparatively simpler and lower cost wireless devices that are unlikely to need to exchange relatively large quantities of data. An example of an intended use of 802.11ah includes enabling the provision of wireless arrays of sensors disposed about a building, a field, onboard vehicles, in traffic signals, on or in people (e.g., medical sensors), animals, etc. Such sensors are envisioned as detecting medical, intrusion, environmental/weather, power transmission/distribution, and other types of data and information, and conveying what is detected to other wireless devices in quantities of data that are generally expected to be relatively small.

Yet, it is also desired to simultaneously accommodate higher function wireless devices (e.g., smart phones, portable computers, etc.) exchanging larger quantities of data. However, the lower data rate of 802.11 ah is expected to result in any exchange of such larger quantities of data taking considerably longer than would be the case with many of the other 802.11 series standards. By way of example, an exchange of the typically larger sized data packet often observed in conveying images, audio, video, etc. between higher function devices via 802.11ah is expected to take 10's of milliseconds to accomplish.

Such lengthy transmission times to transmit a packet greatly increases vulnerability to signal degradation developing and worsening over the time required to complete its transmission. Such signal degradation arises from changing environmental conditions, and introduction of interference from transmission among other devices unrelated to network traffic. Signal degradation can also be caused by Doppler shift effects arising either from one wireless device moving at considerable speed relative to the other (e.g., a wireless device in a vehicle), or from a sizable object moving at considerable speed in the vicinity of the path of the signal between two wireless devices (e.g., a vehicle moving through the area).

Maintaining a high level of signal quality during the transmission of a packet has typically entailed embedding various features in the transmission of each packet, including a preamble that includes a known pattern of symbols to enable initial channel estimate, and the transmission of pilot signals with the packet to enable phase tracking and updates to channel estimate by a receiving wireless device. However, at least some of such features embedded in a transmission require some considerable processing ability (and an accompanying increase in use of electric power) on the part of a receiving wireless device to make use of them. Though such increased requirements may pose a minimal challenge to higher function wireless devices, lower cost wireless devices tend to be more limited in available processing ability and/or available electric power. It is with respect to these and other considerations that the embodiments described herein are needed.

BRIEF DESCRIPTION OF THE DRAWINGS

FIGS. 2*a* and 2*b* illustrate examples of transmissions made among the computing devices of the embodiment of FIG. 1.

DETAILED DESCRIPTION

Figure 1:
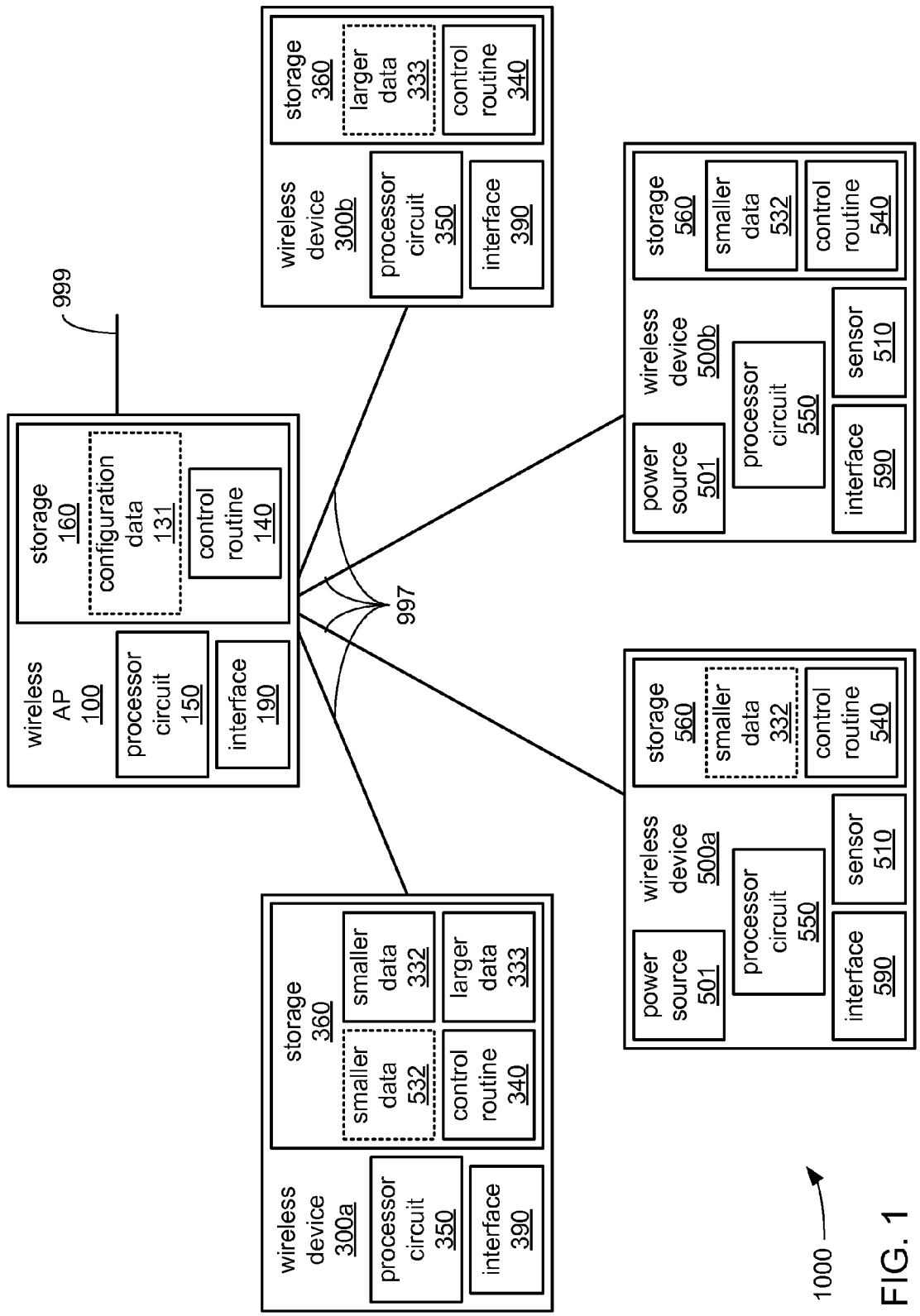
FIG. 1 illustrates an embodiment of interaction among computing devices.

Various embodiments are generally directed to accommodating both high function and low cost wireless devices in a wireless network affected by Doppler effects in addition to wireless channel variations by employing pilot signals that shift among subcarriers during transmission of a packet to support channel estimate updating and phase tracking. In a wireless network including both higher function wireless devices expected to transmit larger and smaller data packets and lower cost wireless devices expected to transmit smaller data packets, recurring adjustment of receivers to maintain higher quality reception of all data packets is enabled through the transmission of a preamble that includes a known combination of symbols across all subcarriers used to convey data symbols at the start of each packet, and the transmission of at least two pilot signals that are caused to shift among the subcarriers used to convey data symbols throughout transmission of the packet.

Higher function wireless devices employ the known combination of symbols in the preamble to derive an initial channel estimate that includes detected characteristics of each subcarrier used to convey data symbols, and then use this initial channel estimate to configure a set of equalizers to adjust reception characteristics for each of those subcarriers to compensate for the detected characteristics. Such higher function wireless devices also receive the pilot signals, as they shift among the subcarriers used to convey data symbols during transmission of a packet, and use those pilot signals to recurringly update the initial channel estimate and to track a shift in phase (phase tracking) that may develop among the subcarriers over the time the packet is transmitted as a result of Doppler effects and one or both of frequency and timing errors of their receivers. It is also envisioned that such higher function wireless devices will also incorporate relatively highly developed DC-offset cancellation and adjacent channel interference (ACI) filtering capabilities sufficient to enable them to make use of the pilot signals for these purposes even as they are transmitted in subcarriers immediately adjacent to DC and guard subcarriers.

Lower cost wireless devices also employ the known combination of symbols in the preamble to derive an initial channel estimate, and also use the initial channel estimate to configure a set of equalizers to adjust reception characteristics for each of those subcarriers to compensate for the detected characteristics. Such lower cost wireless devices also receive the pilot signals, as they shift among the subcarriers used to convey data symbols during transmission of a packet, and use those pilot signals to track a phase shift that may develop over the time the packet is transmitted as a result of Doppler effects and either or both of frequency and timing errors of their receivers. However, such lower cost wireless devices do not use those pilot signals to recurringly update the initial channel estimate. It should also be noted that while it is envisioned that the pilot signals will be transmitted in a manner in which they shift about among the subcarriers used to convey data symbols, it is also envisioned that lower cost wireless devices are also capable of receiving the pilot signals on specific ones of those subcarriers that are assigned for transmission of the pilot signals throughout at least the duration of the transmission of a packet.

Deriving a channel estimate requires considerable processing ability that, in turn, requires considerable consumption of electric power. It is envisioned that lower cost wireless devices, such as sensors in a wireless network of sensors, will likely have access only to power sources of limited capacity (e.g., a battery) able to support only a limited level of processing ability. Further, it is envisioned that at least some of such lower cost wireless devices may be disposable such that there is a strong disincentive to incorporate a more expensive form of processor circuit, thereby also tending to limit processing ability. The expectation that such lower cost wireless devices are likely to engage in exchanges of only smaller quantities of data (such that they are expected to engage in exchanges of only shorter packets requiring less time to transmit) is employed as the basis for such lower cost wireless devices to be accepted as employing the pilot signals only for phase tracking and not to update initial channel estimates. An assumption is made that in exchanges of packets conveying only 100's of bytes of data, at most, the amount of time to transmit those packets is short enough that an initial channel estimate created using the known combination of symbols of the preamble of each packet remains valid enough for use with good results throughout such a shorter transmission time.

It may also be accepted that such lower cost devices will not make use of the transmission of the pilot signals with the transmission of every symbol set during transmission of the packet. In particular, it may be accepted that lower cost wireless devices may incorporate ACI filters of a lesser degree of capability than higher function wireless devices such that they may have a lesser ability to filter out interference from adjacent frequency channels beyond the guard carriers that may leak into the subcarriers used to convey data symbols, and they may have a lesser ability to cancel undesired signals that may appear on the DC subcarrier. Thus, where a pilot signal is transmitted in a subcarrier adjacent to one of the guard or DC subcarriers, such lower cost devices may not have sufficient ACI filtering capability and/or DC cancellation capability to prevent degradation of the quality of that received pilot signal such that they are able to make effective use of that pilot signal in phase tracking. Therefore, it may be accepted that such lower cost wireless devices do not make use of pilot signals that are transmitted on subcarriers that are adjacent to guard or DC subcarriers, and instead, await the transmission of pilot signals on other subcarriers to continue phase tracking.

To support such different reception behaviors between higher function and lower cost wireless devices, such a wireless network may incorporate an ability for a wireless access point (AP) in such a network to be made aware of which wireless devices engage in which of these reception behaviors. It may be that an indication of reception behaviors is transmitted by each wireless device to the AP, possibly as part of a control packet and/or a data packet, or possibly in some form of exchange of configuration information as each wireless device is added to such a wireless network. Alternatively or additionally, an AP in such a wireless network may infer the reception behaviors of each wireless device by monitoring for instances in which transmissions of larger packets to a particular wireless device fail, but transmissions of shorter packets succeed.

In one embodiment, for example, an apparatus includes a receiver to wirelessly receive a first packet comprising first and second shifting pilot signals amidst first data symbols transmitted via multiple subcarriers in symbol sets; a transmitter to wireless transmit a second packet; and logic to track a shift in phase using the first and second shifting pilot signals, configure the receiver to compensate for the shift in phase, refrain from using reception of the first and second shifting pilot signals to update an initial channel estimate derived from a preamble of the first packet, and transmit third and fourth shifting pilot signals amidst second data symbols of the second packet. Other embodiments are described and claimed herein.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may comprise a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1, illustrates an embodiment of a wireless communications system 1000 in which wireless devices exchange packets over a wireless network 997. Among the wireless devices in the communications system 1000 are one or more of a wireless access point (wireless AP) 100, higher function devices 300a and 300b, and lower cost wireless devices 500a and 500b. Each of these computing devices 100, 300a-b and 500a-b may be any of a variety of types of computing device, including without limitation, a desktop computer system, a data entry terminal, a laptop computer, a netbook computer, an ultrabook computer, a tablet computer, a handheld personal data assistant, a smartphone, a digital camera, a mobile device, a body-worn computing device incorporated into clothing, a computing device integrated into a vehicle, a server, a cluster of servers, a server farm, etc. However, it is envisioned that the wireless devices 300a-b are higher function wireless devices with higher processing ability and/or access to a greater amount of electric power, and that the wireless devices 500a-b are lower cost wireless devices with lesser processing ability and/or access to a relatively limited source of electric. It is further envisioned that the wireless devices 500a-b are sensor devices (possibly disposable) that each detect one or more pieces of medical, environmental, security related, gas or electric utility related, and/or other information that each relays to other wireless devices as may be present on the wireless network 997.

As depicted, these computing devices 100, 300a-b and 500a-b exchange signals making up packets of varying sizes and conveying a variety of commands and/or data via the wireless network 997. In various embodiments, the network 997 may be any of a wide variety of types of WWAN, cellular wireless network, WLAN, etc. in which radio frequency and/or optical signaling is employed to exchange signals among these computing devices. Among possible forms of WLAN, the network 997 may conform to one or more of the various 802.11 series wireless networking specifications promulgated by IEEE. However, it is envisioned, in some embodiments, that the network 997 conforms to (or at least uses features of) IEEE 802.11ah wireless network specification currently under development, or a related wireless network specification. As depicted, at least some exchanges of signals among the wireless devices 300a-b and 500a-b are relayed through the wireless AP 100 and/or are arranged to occur more directly among the wireless devices 300a-b and 500a-b by the wireless AP 100. As also depicted, the wireless AP 100 may provide access to another network 999 (e.g., the Internet) for one or more of the wireless devices 300a-b and 500a-b.

In various embodiments, the wireless AP 100 comprises one or more of a processor circuit 150, a storage 160, and an interface, 190 coupling the wireless AP 100 to the network 997. The storage 160 stores one or more of a control routine 140 and a configuration data 131. In executing a sequence of instructions of the control routine 140, the processor circuit 150 is caused to operate the interface 190 to wirelessly exchange signals with each of the wireless devices 300a-b and 500a-b. Depending on the nature and/or configuration of the network 997, the processor circuit 150 is caused to engage in such exchanges of signals to either relay packets among the wireless devices 300a-b and 500a-b, or to arrange exchanges of packets more directly among those wireless devices. Further, in embodiments in which the wireless AP 100 provides access for each of the wireless devices 300a-b and 500a-b to a network 999 (e.g., a wider area network, the Internet, etc.), the processor circuit 150 is caused to relay packets between each of these wireless devices and the network 999.

It should be noted that although only one of the wireless AP 100 is shown, other embodiments of the communications system 1000 are possible in which there are multiple ones of the wireless AP 100, possibly linked to each other via the network 999. Such use of multiple ones of the wireless AP 100 may be in response to the area needing to be covered by the wireless network 997 being sufficiently large that no single one of the wireless AP 100 is able to do so.

In various embodiments, each of the wireless devices 300a and 300b comprises one or more of a processor circuit 350, a storage 360, and an interface 390 coupling each of these wireless devices to the network 997. The storage 360 of each of these wireless devices stores at least the control routine 340. The storage 360 of the wireless device 300a additionally stores a smaller data 332, a larger data 333 and (upon receipt) a smaller data 532. The storage 350 of the wireless device 300b additionally stores a larger data 333 (upon receipt). In executing a sequence of instructions of the control routine 340, the processor circuit 350 of each of these wireless devices is caused to operate their respective ones of the interface 390 to exchange packets conveying data with one or more of the others of the wireless devices 300a-b and 500a-b. In examples to be presented, these exchanges of data will include the various pieces of data depicted as stored in each of the storages 360.

In various embodiments, each of the wireless devices 500a and 500b comprises one or more of a processor circuit 550, a storage 560, sensor 510, power source 501, and an interface 590 coupling each of these wireless devices to the network 997. The storage 560 of each of these wireless devices stores at least the control routine 540. The storage 560 of the wireless device 500a additionally stores the smaller data 332 (upon receipt), and the storage 560 of the wireless device 500b additionally stores a smaller data 532. In executing a sequence of instructions of the control routine 540, the processor circuit 550 of each of these wireless devices is caused to monitor their respective ones of the sensor 510 on a recurring basis to detect any of a variety of events for which each of the ones of the sensor 510 is configured to detect. The processor circuit is also caused to operate their respective ones of the interface 590 to exchange packets conveying data (e.g., sensor data) with one or more of the others of the wireless devices 300a-b and 500a-b. In examples to shortly be presented, these exchanges of data will include the various pieces of data depicted as stored in each of the storages 560.

As will be explained in greater detail, each of the interfaces 190, 390 and 590 include at least a transmitter and a receiver, thereby enabling each of the computing devices 100, 300a-b and 500a-b to both transmit and receive packets via the network 997. Each of these computing devices transmits packets including both a preamble that includes a known combination of symbols to enable initial channel estimate and also includes pilot signals transmitted at various times on various ones of the subcarriers used to convey data symbols to enable channel estimate updating and phase tracking.

Figure 2A:
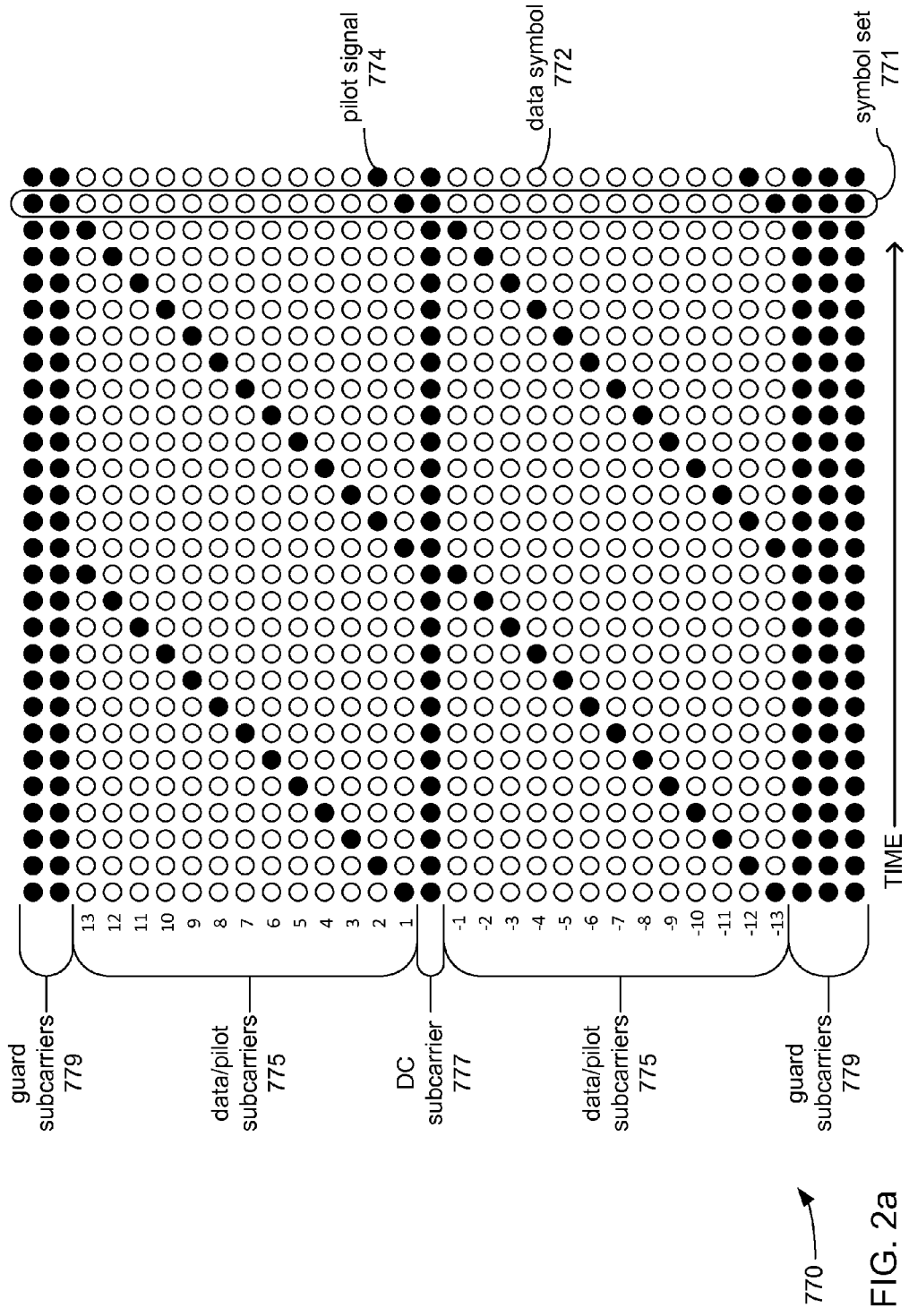

FIGS. 2a and 2b each depict a possible variant of subcarrier allocation that may be used in transmitting a packet 770 via the network 997. As depicted in each variant, 32 subcarriers defining are allocated and define the width of a frequency. These 32 subcarriers include five guard subcarriers 779, a DC subcarrier 777, and 26 data/pilot subcarriers 775. Such an allocation may be appropriate where the bandwidth is about 1 MHz, while for wider bandwidths, there may be greater quantities of subcarriers used for each of these purposes. No signals, symbols or other information of any kind is transmitted on any of the guard carriers 779. The guard carriers 779 are defined and positioned to provide a margin of protection against interference with signals transmitted in adjacent channels. Also, no signals, symbols or other information of any kind is transmitted on the DC subcarrier 777, such that it is often described as "nulled." However, combinations of data symbols 772 and pilot signals 774 are transmitted on different ones of the data/pilot subcarriers 775 at different times. These transmissions of the data symbols 772 and pilot signals 774 occur simultaneously on their respective ones of the data/pilot subcarriers 775. The data symbols 772 are transmitted on selected ones of the data/pilot substantially in parallel in symbol sets 771 (only one of which is highlighted in both FIGS. 2a-b to avoid visual clutter—essentially, each column of the data symbols 772 is a symbol set 771). As those skilled in the art will readily recognize, different quantities and arrangements of different types of subcarriers may be employed in any of a variety of possible alternate embodiments, whether adhering to a widely recognized wireless networking standard, or not. However, the example variants depicted in FIGS. 2a and 2b are meant to represent possible implementations that at least substantially adhere to known aspects of the IEEE 802.11ah WLAN specification currently under development.

The guard subcarriers 775 are positioned at the edges of the frequency band defined by these 32 subcarriers to aid in avoiding interference from an unrelated radio frequency transmission that may occur in an immediately adjacent frequency band (not shown). As will be apparent to those skilled in the art, the provision of guard subcarriers 775 is in recognition the difficulty in achieving band filtering effective enough to enable use of these subcarriers at the edges of this frequency band to transmit data without concern for the occurrence for encountering a considerable degree of interference. Further, the guard subcarriers 779 afford some degree of "cushion" to absorb the effects of a poorly produced frequency band that is meant to occur in an immediately adjacent range of frequencies, but which "leaks" into this frequency band. The DC subcarrier 777 is nulled, at least in part, to better enable the receivers in each of the interfaces 190, 390 and 590 to employ direct-conversion receivers (DCRs) to reduce complexity. As per a commonplace preferred practice, the DC subcarrier 777 is selected to be one of the two subcarriers closest to the middle of this frequency band. Together, the guard subcarriers 775 and the DC subcarrier 777 are sometimes referred to as "null" subcarriers inasmuch as they do not convey commands or data.

The data symbols 772 may be selected to encode both data that includes status/commands for operation and control of the network 997 and data unrelated to the operation of the network 997 (e.g., sensor data) in an orthogonal frequency-division multiplexing (OFDM) symbol set as per 802.11ah. Alternatively, the data symbols 772 may be selected to encode data in a different symbol set more appropriate to other forms of encoding, including and not limited to clipped-OFDM (C-OFDM), single-carrier frequency-domain-equalization (SC-FDE) and signaling-carrier FDMA (SC-FDMA). The data symbols 772 may be transmitted using tones created with one or more forms of modulation, including and not limited to, different orders of quadrature amplitude modulation (QAM), quadrature phase-shift keying (QPSK) and binary phase-shift keying (BPSK). At least where an OFDM symbol set is used, the same form of tone modulation may be used in all transmissions of the data symbols 772 across all of the data/pilot subcarriers 775, or a mixture of forms of tone modulation may be used in transmitting the data symbols 772 on different ones of the data/pilot subcarriers 775.

With the DC subcarrier 777 positioned close to the center of the frequency band (as discussed earlier), the 26 data/pilot subcarriers 775 are split into two groups of 13. One group is numbered from −13 to −1 and the other is numbered 1 to 13 (as per the IEEE 802.11ah specification). As depicted, during the transmission of each symbol set 771 via the data/pilot subcarriers 775, two of the data/pilot subcarriers 775 are used to transmit a pair of the pilot signals 774, leaving the other 24 of these 26 subcarriers to convey the data symbols 772. The two pilot signals 774 are used by a receiving wireless device to track whatever degree of phase shift may occur over time during transmission of a packet that may indicate a growing mismatch in the frequency and/or timing with which the data symbols 772 of each single symbol set 771 are received through their separate ones of the data/pilot subcarriers 775. With the shift in phase of the two pilot signals 774 known, various parameters of a receiver can be adjusted to accommodate those shifted reception timings.

In both of the variants depicted in FIGS. 2a and 2b, each of the two pilot signals 774 shift among the data/pilot subcarriers 775 following the transmission of each of the symbol sets 771. However, other embodiments are possible in which the pilot signals 774 shift among the data/pilot subcarriers 775 less frequently, either at a larger regular interval or at varying intervals. Also, in both variants in FIGS. 2a and 2b, one of the pilot signals 774 remains within the data/pilot subcarriers 775 numbered −13 to −1, and the other remains within the data/pilot subcarriers 775 numbered 1 to 13. As those skilled in the art will readily recognize, this is at least partly due to the desirability of positioning pilot signals among the subcarriers of a frequency band so as to have some substantial portion of the width of that frequency band between them to better enable the tracking of a developing phase shift.

The variants depicted in FIGS. 2a and 2b differ in the pattern of shifting of the two pilot signals 774 among the data/pilot subcarriers 775. FIG. 2a depicts the two pilot signals 774 shifting in a manner in which each "sweeps" across its corresponding set of 13 of the data/pilot subcarriers 775, progressing one subcarrier at a time from one edge of their corresponding sets of 13 of the data/pilot subcarriers 775 to the other, before returning to the edge from which each began their sweeping patterns. Given that both of the pilot signals 774 always shift in unison in the same way and to the same extent, the same quantity of subcarriers (and therefore, the same width of frequencies) is always maintained between them. FIG. 2b depicts each of the pilot signals 774 shifting among its corresponding set of 13 of the data/pilot subcarriers 775 in a random manner, though always with the same quantity of subcarriers maintained between them. Were the two pilot signals 774 to shift randomly among the data/pilot subcarriers 775 in a less coordinated manner, there would be instances in which the two pilot signals 774 would have only one subcarrier (e.g., the DC subcarrier 777) between, thereby reducing their effectiveness for use in phase tracking. It should be noted, however, that despite these particular depictions of particular patterns of shifting of the pilot signals 774 among subcarriers, other patterns are possible in other variants.

It is possible to use the two pilot signals 774 for phase tracking whether they shift among the data/pilot subcarriers 775, or not such that each is permanently assigned to a specific subcarrier. However, their recurring shifting among the data/pilot subcarriers 775 enables them to also be used in updating the initial channel estimate. As previously discussed, at or substantially near the beginning of each transmitted packet is a preamble that includes a known combination of symbols forming a pattern on each of the data/pilot subcarriers 775 that aids in detecting various characteristics of the quality with which the data symbols 772 are able to be received by a wireless device through each of those subcarriers, thereby forming a channel estimate that includes indications of those detected characteristics for each of those subcarriers. That receiving wireless device is then able to employ that channel estimate in setting various parameters of at least a set of equalizers made up of at least one equalizer for each of the data/pilot subcarriers 775 to compensate for those detected characteristics, and thereby enable clearer reception of data symbols 772 on each of the data/pilot subcarriers 775.

However, as also previously discussed, such an initial channel estimate is derived only at the time of transmission of the preamble of a packet. As time progresses following transmission of that preamble, especially in the transmission of a lengthy packet, the characteristics of each of the data/pilot subcarriers 775 may change sufficiently as to make the initial channel estimate invalid to such an extent that the parameter settings of those equalizers may need to be changed for effective reception of data symbols 772 to continue as that same lengthy packet continues to be transmitted. As the two pilot signals 774 are shifted about from one of the data/pilot subcarriers 775 to another, each of the ones of the data/pilot subcarriers 775 on which they are momentarily transmitted is able to again be characterized such that eventually a more recent characterization of all of the data/pilot subcarriers 775 is achieved, thereby creating an updated channel estimate.

Returning to FIG. 1, although as just detailed, each of the wireless AP 100, the wireless devices 300a-b and the wireless devices 500a-b engage in similar transmission behaviors (all transmitting preambles with known combinations of symbols to enable an initial channel estimation, and all transmit shifting pilot signals). However, the wireless AP 100 and the wireless devices 300a-b engage in reception behaviors that differ from those of the wireless devices 500a-b. Specifically, the wireless AP 100 and the wireless devices 300a-b make use of the shifting of the pilot signals 774 among the data/pilot subcarriers 775 to derive updated channel estimates as well as for phase tracking. In contrast, although the computing devices 500a-b do make use of these shifting pilot signals 774 in phase tracking, they do not make use of them to derive updated channel estimates. As a result, and as will be explained in greater detail, the wireless devices 500a-b are at least less likely to be able to receive larger packets where Doppler effects are prominent. It should be noted that where there are minimal or no Doppler effects, the lack of use of the shifting pilot signals 774 to update channel estimates would not prevent either of the wireless devices 500a-b from receiving larger packets.

As those skilled in the art will readily recognize, this limitation of the wireless devices 500a-b in the size of packets that they are able to receive where Doppler effects are prominent does not preclude effective participation by the wireless devices 500a-b in whatever protocols that may be employed in the network 997 to determine and control which wireless device transmits at any given time. This arises from the expectation that typical request-to-send, clear-to-send, acknowledge (ACK) and/or other variants of packets (often referred to as control packets) employed in coordinating transmission activity in a wireless network tend to be relatively short in length. Indeed, the often present desire to minimize overhead in coordinating transmissions among wireless devices often encourages the use of relatively small packets for such purposes. Thus, it is envisioned that an inability to receive larger packets successfully is likely to have bearing only in receiving packets conveying data. However, for lower cost wireless devices that are not expected to exchange large packets of data, this limitation is envisioned as unlikely to be significant, even if used under conditions in which Doppler effects are prominent.

In various embodiments, each of the processor circuits 150, 350 and 550 may comprise any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of these processor circuits may comprise a multi-core processor (whether the multiple cores coexist on the same or separate dies), and/or a multi-processor architecture of some other variety by which multiple physically separate processors are in some way linked. Alternatively or additionally, one or more of these processor circuits may be implemented with an application-specific integrated circuit (ASIC) to provide a variant of processor that is customized for its use, possibly incorporating a specialized state machine.

In various embodiments, each of the storages 160, 360 and 560 may be based on any of a wide variety of information storage technologies, possibly including volatile technologies requiring the uninterrupted provision of electric power, and possibly including technologies entailing the use of machine-readable storage media that may or may not be removable. Thus, each of these storages may comprise any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may comprise multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, each of the interfaces 190, 390 and 590 employ any of a wide variety of wireless signaling technologies enabling each of computing devices 100, 300 and 500 to be coupled through the network 997 as has been described. Each of these interfaces comprises circuitry providing at least some of the requisite functionality to enable such coupling. However, each of these interfaces may also be at least partially implemented with sequences of instructions executed by corresponding ones of the processor circuits 150, 150, 350 and 550 (e.g., to implement a protocol stack or other features). Where one or more portions of the network 997 entails the use of wireless signal transmission, corresponding ones of the interfaces 190, 390 and 590 may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. It should be noted that although each of the interfaces 190, 390 and 590 are depicted as a single block, one or more of these may comprise multiple interfaces that may be based on differing signaling technologies. This may be the case especially where one or more of these interfaces couples the computing device 100 to more than one network (e.g., the networks 997 and 999), each possibly employing differing communications technologies.

Figure 3:
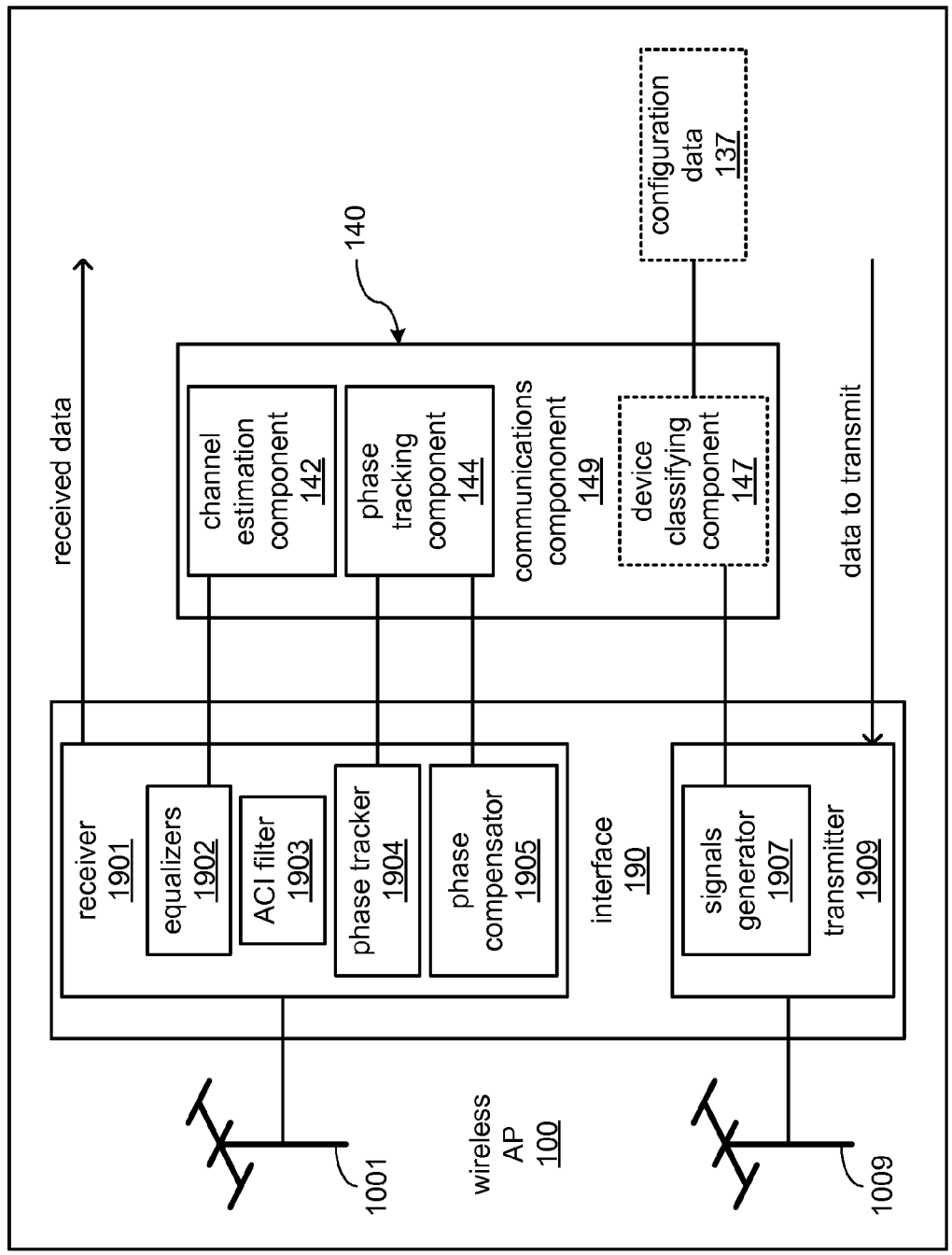
FIG. 3 illustrates a portion of the embodiment of FIG. 1.
Figure 4:
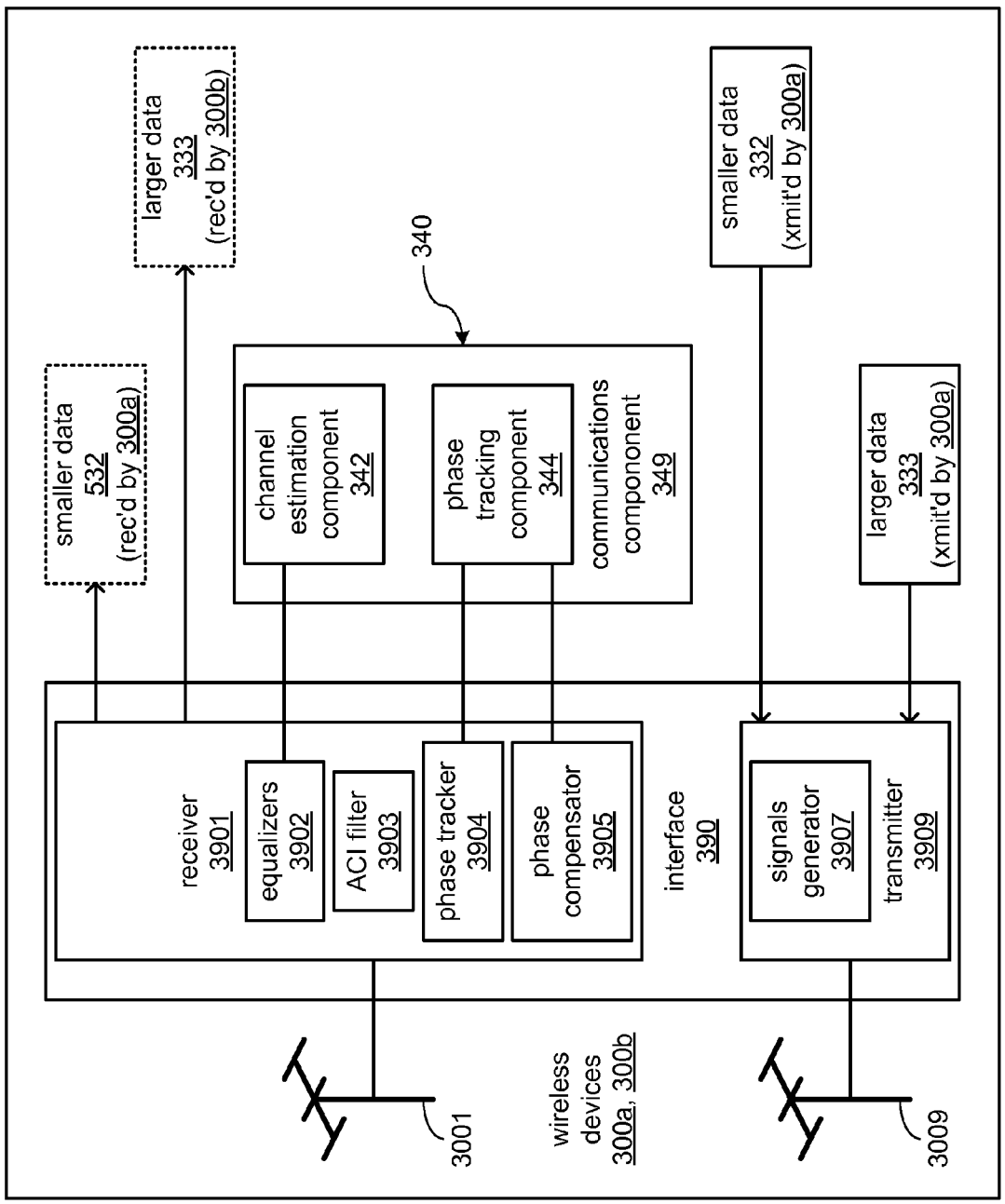
FIG. 4 illustrates a portion of the embodiment of FIG. 1.
Figure 5:
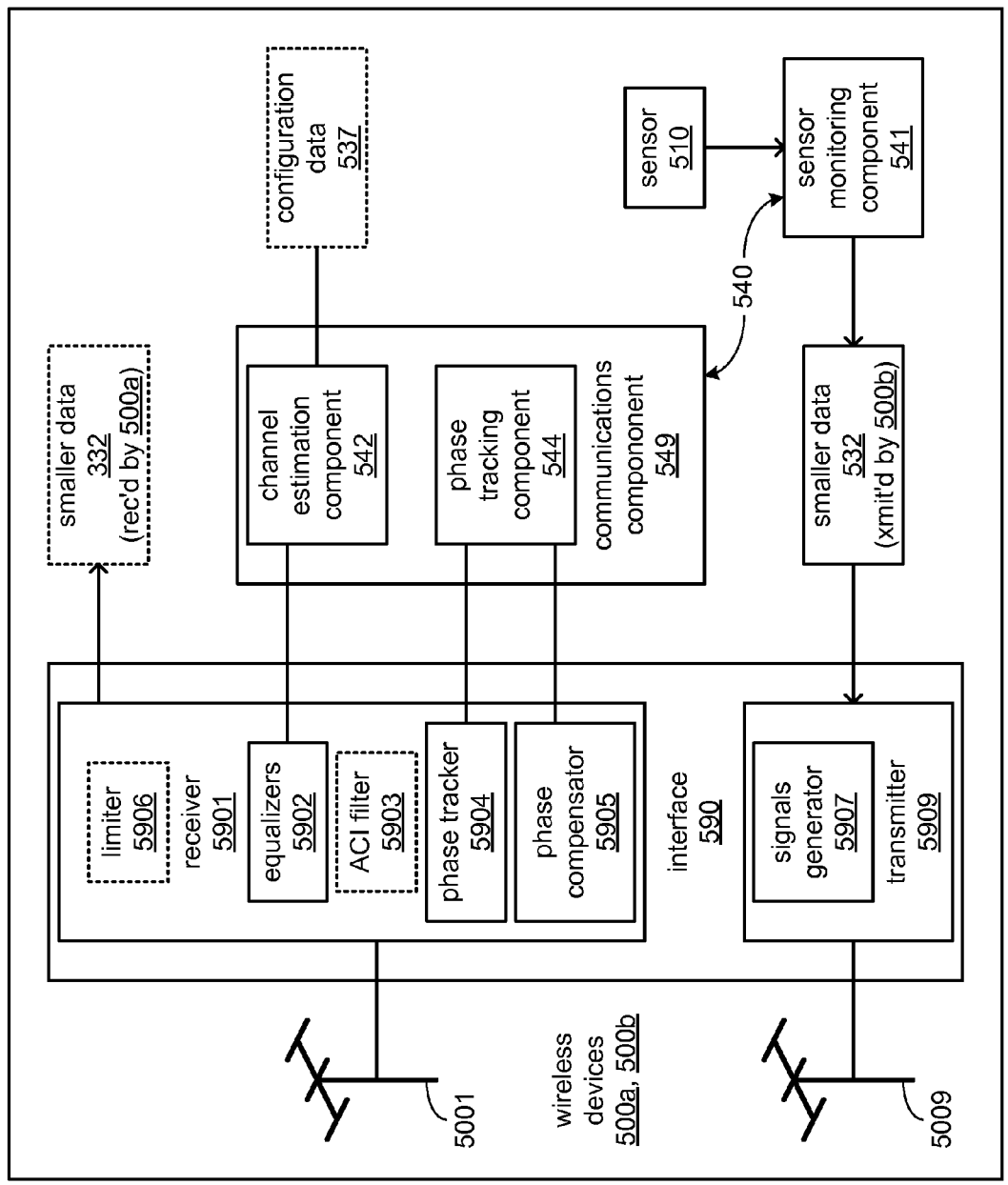
FIG. 5 illustrates a portion of the embodiment of FIG. 1.

FIGS. 3, 4 and 5, taken together, illustrate block diagrams of portions of the block diagram of FIG. 1 depicted in greater detail. More specifically, aspects of the operating environments of the computing devices 100, 300*a-b* and 500*a-b*, are depicted, in which corresponding ones of the processor circuits 150, 350 and 550 (FIG. 1) are caused by execution of respective control routines 140, 340 and 540 to perform the aforedescribed functions. As will be recognized by those skilled in the art, each of the control routines 140, 340 and 540, including the components of which each is composed, implement logic as a sequence of instructions and are selected to be operative on whatever type of processor or processors that are selected to implement each of the processor circuits 150, 350 and 550. Further, it is important to note that despite the depiction in these figures of specific allocations of implementation of logic between hardware components and routines made up of instructions, different allocations are possible in other embodiments.

In various embodiments, one or more of the control routines 140, 340 and 540 may comprise a combination of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor circuits 150, 350 and 550, including without limitation, Windows™, OS X™, Linux®, Android OS™, and ThreadX®. Where one or more device drivers are included, those device drivers may provide support for any of a variety of other components, whether hardware or software components, that comprise one or more of the computing devices 100, 300 and 500.

Turning more specifically to FIG. 3, the control routine 140 includes a communications component 149, executable by the processor circuits 150 to operate the interface 190 to transmit and receive signals via the network 997 (and possibly also the network 999). In turn, the communications component 149 includes a channel estimation component 142, a phase tracking component 144 and possibly a device classifying component 147. The interface 190 includes a receiver 1901 coupled to an antenna 1001 and operable to receive packets from at least the network 997; and a transmitter 1909 coupled to an antenna 1009 and operable to transmit packets via the network 997 to other wireless devices. In turn, the receiver includes equalizers 1902, an adjacent-channel interference (ACI) filter 1903, a phase tracker 1904, and a phase compensator 1905. Also in turn, the transmitter 1909 includes a signals generator 1907.

In transmitting a packet, the processor circuit 150 is caused to operate the transmitter 1909 of the interface 190 to initially transmit a preamble that includes a known combination of symbols forming a pattern useable by another wireless device to derive an initial channel estimate, and then to transmit data symbols conveying whatever command(s), indication(s) of status and/or data is intended to be conveyed in that packet. In so doing, the signals generator 1907 is employed to generate at least two pilot signals. This transmission may employ an organization of subcarriers defining a frequency band such as what is depicted in either of FIG. 2*a* or 2*b*, or this transmission may employ a different configuration and/or differing quantities of types of subcarriers. Regardless of the exact details of the quantity and organization of subcarriers, the data symbols and pilot signals are caused to share the same data/pilot subcarriers in a manner in which the pilots shift among those data/pilot subcarriers over time as symbols sets are transmitted to enable both channel estimate updating and phase tracking. This transmission behavior, including the transmission of a preamble that includes known patterns of symbols and the transmission of shifting pilot signals (or possibly, transmission of pilot signals on assigned subcarriers such that they do not shift during transmission of the packet), is always engaged in during the transmission of any packet, regardless of length or the identity of the wireless device to which it is being transmitted.

In receiving a packet, the processor circuit 150 is caused to operate the receiver 1901 of the interface 190 to initially receive a preamble that includes a known combination of symbols forming a pattern selected to enable detection of various characteristics of reception of each subcarrier employed in transmitting at least the data of that packet. The processor circuit 150 is caused, through execution of instructions of the channel estimation component 142, to employ those detected characteristics of each of those subcarriers to derive an initial channel estimation, and then to employ that initial channel estimation in setting parameters of at least the equalizers 1902. The equalizers 1902 include at least one equalizer for each of at least the subcarriers used in transmitting data symbols (and also pilot signals), and parameters for each are set to compensate for their detected characteristics to improve the quality of reception of those data symbols.

Following receipt of the preamble, the processor circuit 150 is further caused to operate the receiver 1901 to receive the remainder of the packet, including data symbols conveying whatever command(s), indication(s) of status and/or data is intended to be conveyed in that packet. As has been discussed at length, embedded within at least that remainder of that packet are at least two pilot signals received on different ones of the data/pilot subcarriers as receipt of that packet continues over time, with the at least two pilot signals shifting among the data/pilot carriers multiple times. The ACI filter 1903 is selected to be capable of effectively rejecting interference. As a result, the receiver 1901 is capable of receiving the information conveyed in a pilot signal where it is transmitted on a one of the data/pilot subcarriers that is adjacent to a guard or DC subcarrier. Thus, all of the pilot signals embedded in the remainder of the packet are able to be used in updating channel estimation and phase tracking without regard for which one of the data/pilot subcarriers they are transmitted on.

As the pilot signals are received on different ones of the data/pilot subcarriers, it becomes possible at various times during reception of the remainder of the packet for the processor circuit 150 to be caused by execution of the instructions of the channel estimation component 142 to again derive a channel estimate, and then use this new channel estimate derived from the shifting pilot signals to update the initial channel estimate derived based on the symbols received in the preamble. Depending on the length of the packet, such derivation of an updated channel estimate may occur more than once. With each such updated channel estimate, the processor circuit is caused to update parameters of at least the equalizers 1902 to compensate for changing characteristics of reception of data symbols via each of the data/pilot subcarriers.

As the pilot signals are received on different ones of the data/pilot subcarriers, it becomes possible to recurringly track the development of any shift in phase as a result of mismatches in frequency and/or timings by which data symbols are received from each of the data/pilot subcarriers with the reception of each symbol set. The processor circuit 150 is caused by execution of instructions of the phase tracking component 144 to monitor the phase tracker 1904 for tracking the development of such a shift in phase, and to respond by setting parameters of the phase compensator 1905 to compensate for mismatched frequency and/or timings by which data symbols of each symbol set may be received from the different data/pilot subcarriers.

This reception behavior by the wireless AP 100, including initial channel estimation, updating channel estimation (presuming the pilot signals are transmitted such that they shift among subcarriers, instead of remaining within assigned subcarriers) and phase tracking, is always engaged in during the receipt of any packet, regardless of packet length or the identity of the wireless device from which it is received. It is envisioned that, in serving as an access point, the wireless AP 100 is provided with sufficient processing ability and sufficient electric power to be able to perform all of these aspects of its reception behavior in all instances of receiving a packet.

Turning more specifically to FIG. 4, the control routine 340 includes a communications component 349, executable by the processor circuits 350 to operate the interface 390 to transmit and receive signals via the network 997. In turn, the communications component 349 includes a channel estimation component 342 and a phase tracking component 344. The interface 390 includes a receiver 3901 coupled to an antenna 3001 and operable to receive packets from at least the network 997; and a transmitter 3909 coupled to an antenna 3009 and operable to transmit packets via the network 997 to other wireless devices. In turn, the receiver includes equalizers 3902, an adjacent-channel interference (ACI) filter 3903, a phase tracker 3904, and a phase compensator 3905. Also in turn, the transmitter 3909 includes a signals generator 3907.

As depicted, the types and configuration of components making up each of the communications component 349 and the interface 390 of the wireless devices 300*a-b* are substantially the same and function in substantially the same ways as their counterparts in the communications component 149 and the interface 190 of the wireless AP 100. Indeed, due to this degree of similarity, like components have been given reference numbers in which the last two digits correspond. Thus, the transmission and reception behaviors of the wireless devices 300*a-b* are substantially similar to those just described in detail of the wireless AP 100.

One substantive difference between the communications components 149 and 349 is the possible inclusion of the device classifying component 147 in the communications component 149 by which the wireless AP may perform additional actions in its transmission behavior to accommodate lower cost wireless devices, such as the wireless devices 500*a-b*, as will later be described. The optional nature of the inclusion of the device classifying component 147 is indicated in its being depicted with dotted lines.

Turning more specifically to FIG. 5, the control routine 540 includes a communications component 549, executable by the processor circuits 550 to operate the interface 590 to transmit and receive signals via the network 997. In turn, the communications component 549 includes a channel estimation component 542 and a phase tracking component 544. The interface 590 includes a receiver 5901 coupled to an antenna 5001 and operable to receive packets from at least the network 997; and a transmitter 5909 coupled to an antenna 5009 and operable to transmit packets via the network 997 to other wireless devices. In turn, the receiver includes equalizers 5902, an adjacent-channel interference (ACI) filter 5903 (possibly), a phase tracker 5904, and a phase compensator 5905. Also in turn, the transmitter 5909 includes a signals generator 5907.

As depicted, the types and configuration of components making up each of the communications component 549 and the interface 590 of the wireless devices 500*a-b* are substantially the same and function in substantially the same ways as their counterparts in the communications component 349 and the interface 390 of the wireless devices 300*a-b*. Indeed, due to this degree of similarity, again, like components have been given reference numbers in which the last two digits correspond. However, as will now be explained, although the transmission behavior of the wireless devices 500*a-b* are substantially similar to that of the wireless device 300*a-b*, the reception behaviors between the wireless devices 300*a-b* and the wireless devices 500*a-b* are at least partly different.

One substantive difference between the communications components 349 and 549 is that, the processor circuit 550 is caused by the channel estimation component 542 to derive only the initial channel estimate based on the known combinations of symbols in the preamble of any received packet, and not to perform any updating of the initial channel estimate using the pilot signals as the remainder of a packet is received. This arises from the expectation that, given the lower cost nature of the wireless devices 500*a-b* and that they are envisioned be a relatively simple computing devices such as wireless sensor devices, each of the wireless devices 500*a-b* is unlikely to engage in the exchange of any lengthy packet such that a recurring updating of the initial channel estimate during packet reception is not necessary. As previously discussed, the derivation of a channel estimate requires considerable processing ability, and in dispensing with deriving updated channel estimates at the same time that command(s), indication(s) of status and/or data are being received in the remainder of a packet (following its preamble) affords an opportunity to employ lower cost processing components to implement the processor circuit 550.

Another substantive difference, as hinted with the ACI filter 5903 being depicted with dotted lines, may be that the receiver 5901 either does not incorporate the ACI filter 5903 at all, or that the ACI filter 5903 is not as capable as the ACI filter 3903 of the wireless devices 300*a-b* in avoiding any degradation in a pilot signal where the pilot signal is transmitted in a data/pilot subcarrier adjacent to a guard subcarrier. In such embodiments, the phase tracking component 544 and/or the phase tracker 5904 may simply ignore a pilot signal that is transmitted in a data/pilot subcarrier adjacent to a guard subcarrier and/or a DC subcarrier.

Returning to FIG. 3, and as has been previously discussed, the communications component 149 of the wireless AP 100 may additionally include the device classifying component 147 by which the wireless AP may perform additional actions in its transmission behavior to accommodate lower cost wireless devices, such as the wireless devices 500*a-b*. In various possible embodiments, execution of instructions of the device classifying component 147 causes the processor circuit 150 to undertake various possible actions to ascertain which ones of the wireless devices 300*a-b* and 500*a-b* are able to successfully receive longer packets and/or to accommodate wireless devices known or determined to be able to successfully receive only shorter packets by breaking up a larger packet into smaller packets before transmission.

In one possible embodiment, the network 997 may provide a mechanism by which the wireless AP 100 is able to be presented with information concerning at least the inability of some wireless devices (e.g., the wireless devices 500*a-b*) to successfully receive larger packets. Such a mechanism may be a transmission of configuration data from such wireless devices to the wireless AP 100, which the processor circuit 150 is then caused to store as part of the configuration data 137. Alternatively or additionally, such a mechanism may be a bit or other indicator conveyed in one or more packets from such wireless devices to the wireless AP 100.

In another possible embodiment, the wireless AP 100 may observe the manner in which each of the wireless devices 300*a-b* and 500*a-b* respond to instances of having packets of different sizes transmitted to them for indications of one or more of them demonstrating that they are incapable of successfully receiving larger packets. Such indications may be the lack of transmission of ACK (acknowledgement) packets, the transmission of a NACK (no-acknowledgement) packets, requests to resend or repeat transmission, and/or other signals from different ones of these wireless devices indicating a packet reception error in response to receiving a larger packet, but with no such transmission occurring in response to receiving a smaller packet. The processor circuit 150 may be caused by the device classifying component 147 to infer that such a pattern in signaling indicates an inability to receive larger packets, and the processor circuit 150 may then be caused to store an indication of this inference having as part of the configuration data 137.

Regardless of the exact manner in which the wireless AP 100 is enabled to distinguish wireless devices able to receive larger packets from those that cannot (in particular, where Doppler effects are prominent), the wireless AP 100 may be caused to refer to indications of an ability to receive larger packets in the configuration data 137 in transmitting a packet to a wireless device. Where there is an indication that the wireless device to be transmitted to cannot successfully receive larger packets, the processor circuit 150 may then be caused to break up a larger packet to be sent to that wireless device into smaller packets.

Returning to FIG. 5, in some embodiments, the receiver 5901 may be identical to the receiver 3901 and/or the processor circuit 550 may be identical to the processor circuit 350 such that these components of the wireless devices 500*a-b* are just as capable of being operated to receive larger packets as their counterparts of the wireless devices 300*a-b*, but are placed in a lower function mode of operation in which such updating of the initial channel estimate using pilot signals and/or ACI filtering is disabled to reduce power consumption. This may be deemed appropriate to reap the benefits of economies of scale by using identical parts in manufacturing each of the wireless devices 300*a-b* and 500*a-b*, but accommodating reduced availability of electric power and lack of need to accommodate larger packets for the wireless devices 500*a-b*. In some variants, setting of such a lower function mode may be through the provision of a configuration data 537 (possibly stored in a nonvolatile portion of the storage 560) that indicates to the processor circuit 550 that updated channel estimates using pilot signals and/or ACI filtering are to be disabled. The processor circuit 550 may then respond accordingly by configuring at least the ACI filter 5903 of the receiver 5901 and/or by refraining from deriving updated channel estimates. In other variants, setting of such a lower function mode may be accomplished via blowing a fuse or otherwise embedding an indication to operate in the lower function mode within the processor circuit 550 and/or the receiver 5901 at the time of their manufacture. Still other mechanisms to provide an indication to operate in the lower function mode to the processor circuit 550 and/or the receiver 5901 are possible, including strapping resistors and other techniques that will be familiar to those skilled in the art.

Alternatively or additionally, the receiver 5901 may additionally incorporate a limiter 5906 to more immediately stop reception of and/or reject larger packets that other wireless devices may attempt to transmit to the wireless devices 500*a-b*. Following reception of the preamble, and before reception of a remaining portion of the packet that conveys its data, an intermediate portion (sometimes referred to as a "signal field") conveys an indication of how much data and/or the length of the remainder of the packet. In response to this indication of data or packet length exceeding a selected threshold, the limiter 5906 may signal the receiver 5901 and/or the processor circuit 550 with an indication that the selected threshold will be exceeded by the remainder of the packet. In response to this, the processor circuit 550 and/or the receiver 5901 may signal or operate the transmitter 5909 to transmit a NACK or other signal to the wireless device transmitting the packet that there has been an error in reception of the packet and/or the packet is not otherwise accepted (or alternatively, refrain from signaling or operating the transmitter 5909 to transmit an ACK or other signal within a time period in which it would be expected as an indication of successful receipt or acceptance of the packet). It may be deemed preferable to set such a threshold to trigger such a response rather than to continue to allow limited electric power to continue to be consumed in what is expected to be an ultimately unsuccessful effort to receive the entire packet (especially where it is known that transmissions are occurring in an environment in which Doppler effects are prominent such that successful reception of a larger packet is deemed highly unlikely). Further such consistent behavior in rejecting larger packets may provide a consistent indication to the wireless AP 100 that the wireless devices 500*a-b* are not able to successfully receive larger packets.

To further illustrate differences in transmission and/or reception behavior among the computing devices 100, 300*a-b* and 500*a-b*, various examples of exchanging both larger and smaller amounts of data among these computing devices will now be described. In these examples, larger and smaller packets arising from the transmission of larger or smaller pieces of data are exchanged, and the interplay among the various transmission and reception behaviors of these computing devices 100, 300a-b and 500a-b are described.

In one example, the wireless device 300a transmits the smaller data 332 in a smaller packet to the wireless device 500a. The wireless device 300a may begin by transmitting one or more control packets requesting an opportunity to transmit data to the wireless AP 100, and eventually receives one or more packets from the wireless AP 100 giving the wireless device 300a permission to do so. At least some of the other wireless devices in the network 997 are in close enough range to the wireless device 300a and the wireless AP 100 to receive and observe this exchange of control packets, and as previously discussed, these control packets are expected to be relatively short, such that any of these wireless devices are expected to be able to successfully receive them. Alternatively, the protocol of the network 997 may allow the wireless device 300a to sense a period of time in which no activity has occurred such that the wireless device 300a may simply proceed with transmission without an exchange of control packets to explicitly request permission to do so.

In embodiments where the wireless AP 100 merely coordinates transmissions between other wireless devices, the wireless device 300a transmits a data packet conveying the smaller data 332 directly to the wireless device 500a. In transmitting this data packet, the wireless device 300a begins by transmitting a preamble that includes a known combination of symbols creating a pattern that enables the wireless device 500a to detect characteristics of each data/pilot subcarrier to derive an initial channel estimate, and to then use that initial channel estimate to configure parameters of equalizers for each of those data/pilot subcarriers to compensate for those detected characteristics to aid in clear reception of the data symbols to come. The wireless device 300a then transmits the remainder of the packet conveying the smaller data 332 to the wireless device 500a, embedding at least two pilot signals in separate ones of the data/pilot subcarriers, shifting them among different ones of those subcarriers over time, as it does so. The wireless device 500a receives the data symbols and pilot signals from the data/pilot subcarriers, and employs these shifting pilot signals in phase tracking, but not in updating the initial channel estimate. Further, the wireless device 500a may not make use of the pilot signals at times when at least one of them is transmitted in a data/pilot subcarrier that is adjacent to a guard carrier or a DC carrier. Given the shorter length of this data packet, due primarily to the smaller amount of data of which the smaller data 332 is composed, this lack of updating of the initial channel estimate and possible lack of use of every transmission of each of the pilot signals poses no problems in the reception of this smaller data packet. Upon receiving all of this smaller data packet, the wireless device 500a transmits a signal indicating its successful receipt.

In embodiments where the wireless AP 100 relays at least data packets between wireless devices (such that wireless devices do not typically exchange data packets directly between them), the wireless AP 100 receives a smaller data packet conveying the smaller data 332 from the wireless device 300a, and then retransmits the smaller data 332 in a separate transmission of a smaller data packet to the wireless device 500a. This transmission of the smaller data packet from the wireless AP 100 to the wireless device 500a proceeds between the wireless AP 100 and the wireless device 500a in substantially the same manner as the transmission of the smaller data packet directly from the wireless device 300a to the wireless device 500a just described in detail.

In another example, the wireless device 300a transmits the larger data 333 in a larger packet to the wireless device 300b. The wireless device 300a again begins by transmitting one or more control packets requesting an opportunity to transmit data to the wireless AP 100, and eventually receives one or more packets from the wireless AP 100 giving the wireless device 300a permission to do so.

In embodiments where the wireless AP 100 merely coordinates transmissions between other wireless devices, the wireless device 300a transmits a data packet conveying the larger data 333 directly to the wireless device 300b. In transmitting this data packet, the wireless device 300a again begins by transmitting a preamble that includes a known combination of symbols creating a pattern that enables the wireless device 300b to detect characteristics of each data/pilot subcarrier to derive an initial channel estimate, and to then use that initial channel estimate to configure parameters of equalizers for each of those data/pilot subcarriers to compensate for those detected characteristics to aid in clear reception of the data symbols to come. The wireless device 300a then transmits the remainder of the packet conveying the larger data 333 to the wireless device 300b, embedding at least two pilot signals in separate ones of the data/pilot subcarriers, shifting them among different ones of those subcarriers over time, as it does so. The wireless device 300b receives the data symbols and pilot signals from the data/pilot subcarriers, and employs these shifting pilot signals in both phase tracking and updating its initial channel estimate. Further, the wireless device 300b incorporates the ability to make use of the pilot signals each time they are transmitted, regardless of which ones of the data/pilot subcarriers are used to transmit them. Alternatively, where the variations in the channel are determined to be more benign and occurring at a slower pace, the wireless device 300b may make use of the pilot signals less frequently, possibly only every other transmission of the pilot signals, possibly once every three, four or more transmissions of the pilot signals. Given the use of both phase tracking and channel estimate updating, the wireless device 300b is able to successfully receive the entirety of the larger packet conveying the larger data 333. Upon receiving all of this larger data packet, the wireless device 300b transmits a signal indicating its successful receipt.

In embodiments where the wireless AP 100 relays at least data packets between wireless devices (such that wireless devices do not typically exchange data packets directly between them), the wireless AP 100 receives a larger data packet conveying the larger data 333 from the wireless device 300a, and then retransmits the larger data 333 in a separate transmission of a larger data packet to the wireless device 300b. This transmission of the larger data packet from the wireless AP 100 to the wireless device 300b proceeds between the wireless AP 100 and the wireless device 300b in substantially the same manner as the transmission of the larger data packet directly from the wireless device 300a to the wireless device 300b just described in detail.

In comparing these two above examples, it can be seen that the transmission behavior of the wireless device 300a or of the wireless AP 100 in transmitting either smaller or larger packets is the same. Whether a preamble with known combinations of symbols to enable derivation of an initial channel estimate or shifting pilot signals are provided in a packet does not depend on the size of that packet. A substantial difference exists in the reception behavior between the wireless device 300b (which is able to successfully receive larger packets, even where Doppler effects are prominent) and the wireless device 500a (which is not able to successfully receive larger packets where Doppler effects are prominent). The wireless device 300b makes greater use of the shifting pilot signals transmitted in changing ones of the data/pilot subcarriers to enable successful receipt of larger packets.

In still another example, the wireless device 500b transmits the smaller data 532 in a smaller packet to the wireless device 500b. The smaller data 532 may include indications of an event detected by the sensor 510, the processor circuit 550 having been caused to monitor the sensor 510 by execution of instructions of the sensor monitoring component 541. The wireless device 500b may begin by transmitting one or more control packets requesting an opportunity to transmit data to the wireless AP 100, and eventually receives one or more packets from the wireless AP 100 giving the wireless device 500b permission to do so (or, as previously discussed, may detect inactivity in the network 997 such that it is able to proceed without first obtaining permission). The wireless device 500b then proceeds to transmit a smaller data packet, either directly to the wireless device 300a or to the wireless AP 100 for retransmission to the wireless device 300a with a transmission behavior that is substantially identical to the just described transmission behavior of the wireless device 300a. In other words, the wireless device 500b transmits a preamble with a known combination of symbols to enable derivation of an initial channel estimate, and the wireless device 500b transmits shifting pilot signals amidst the data symbols on the data/pilot subcarriers to enable phase tracking and channel estimate updating. Although aspects of the reception behavior, most notably updating channel estimates, may require considerable processing ability, the transmission of such a preamble and of shifting pilot signals does not. Thus, the burden placed on the wireless device 500b, even with more limited processing ability and/or electric power, is deemed minimal.

Were there to be an instance of one of the wireless AP 100 or the wireless devices 300a-b attempting to transmit a larger packet to one of the wireless devices 500a-b in conditions that include significant Doppler effects, the result would likely be a response in the form of a signal indicating an error in reception and/or rejection of the packet. By not employing the shifting pilot signals to derive updated channel estimates, it is unlikely that the quality of the reception of symbol sets of data symbols could be maintained long enough amidst significant Doppler effects to successfully receive all of them, thereby likely leading to detection of a data error (e.g., via a cyclic redundancy check or other error detection algorithm). Alternatively, where the one of the wireless devices 500a-b implements the limiter 5906, that one of the wireless devices 500a-b may simply signal the sending wireless device with an indication that further reception of the packet is rejected in response to the selected threshold of quantity of data or length of packet being exceeded. Where the wireless AP 100 implements an ability to infer the inability of some wireless devices in the network 997 to successfully receive larger packets, the wireless AP 100 may observe these indications of errant reception and/or rejection of reception, and store indications of an inference that one or both of the wireless devices 500a-b is unable to successfully receive larger packets.

Figure 6:
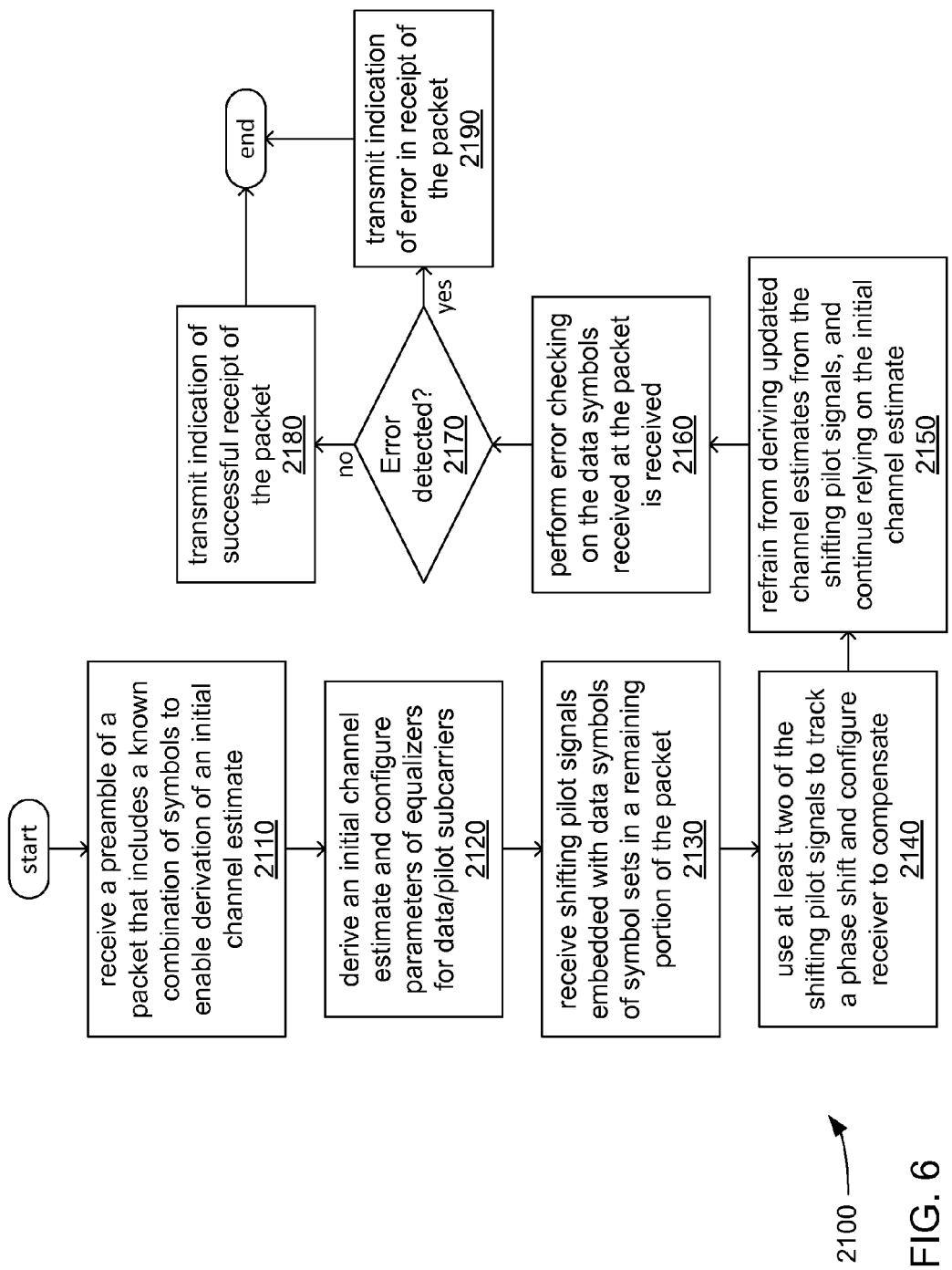
FIG. 6 illustrates an embodiment of a first logic flow.

FIG. 6 illustrates one embodiment of a logic flow 2100. The logic flow 2100 may be representative of some or all of the operations executed by one or more embodiments described herein. More specifically, the logic flow 2100 may illustrate operations performed by components of one of the wireless devices 500a-b, including at least the processor circuit 550 in executing at least the control routine 540 and/or components of the interface 590.

At 2110, a wireless device (e.g., one of the wireless devices 500a-b) receives the preamble of a packet that includes a known combination of symbols to enable detection of characteristics of at least subcarriers to be used in conveying data symbols of the packet (e.g., the data/pilot subcarriers 775). This enables the wireless device to derive an initial channel estimate indicative of the detected characteristics of each of those subcarriers.

At 2120, the wireless device so derives the initial channel estimate, and employs it in configuring parameters of equalizers for those subcarriers. More specifically, the wireless device configures a set of equalizers (at least one per subcarrier used to transmit data symbols) to compensate for those detected characteristics of those subcarriers.

At 2130, the wireless device receives a remaining portion of the packet in which data symbols conveying command(s), indication(s) of status and/or data are conveyed, and receives shifting pilot signals (at least two) embedded among the subcarriers used to transmit the data symbols. As has been discussed, these pilot signals are "shifting" pilot signals in the sense that they shift among these subcarriers over time as the packet is transmitted.

At 2140, the wireless device uses the at least two of the shifting pilot signals for phase tracking in which any developing shift in phase from one symbol set to another is tracked as they may indicate a developing shift in phase among the data symbols of each symbol set as those data symbols are transmitted in their separate subcarriers. The wireless device uses such indications of a developing phase shift to configure its receiver to compensate for a presumably corresponding phase shift of data symbols.

At 2150, despite using the shifting pilot signals for phase tracking, the wireless device refrains from using them to derive updated channel estimates. Instead, the wireless device continues to rely on the initial channel estimate, and more particularly, on the parameter setting with which the equalizers were configured based on the initial channel estimate.

At 2160, the wireless device recurringly performs error checking on the data symbols as they continue to be received. If at 2170, no errors are detected, then the wireless device transmits an indication of successful receipt of the entirety of the packet at 2180. However, if errors are detected, then the wireless device either explicitly or implicitly (depending on protocol) transmits an indication of there being an error in reception or rejection of the packet at 2190 (e.g., explicitly by transmission of a NACK packet, or implicitly by not transmitting an ACK packet).

Figure 7:
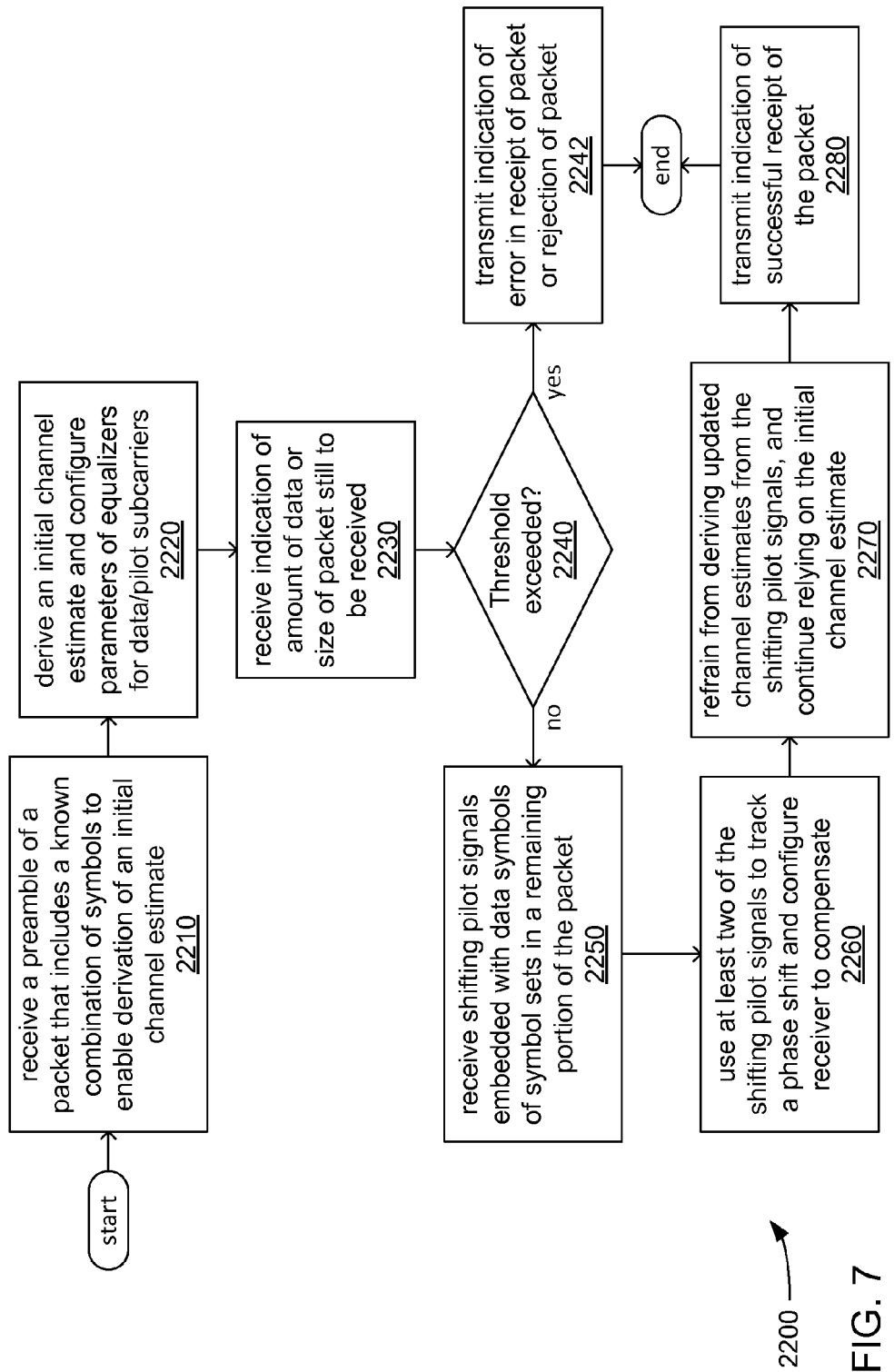
FIG. 7 illustrates an embodiment of a second logic flow.

FIG. 7 illustrates one embodiment of a logic flow 2200. The logic flow 2200 may be representative of some or all of the operations executed by one or more embodiments described herein. More specifically, the logic flow 2200 may illustrate operations performed by components of one of the wireless devices 500a-b, including at least the processor circuit 550 in executing at least the control routine 540 and/or components of the interface 590.

From 2210 to 2220, a wireless device (e.g., one of the wireless devices 500a-b) receives and responds to receipt of a packet in much the same way as just described in the logic flow 2100 of FIG. 7. The logic flows 2100 and 2200 differ starting at 2130 and 2230, respectively.

At 2230, the wireless device receives an indication, following receipt of the preamble, of either the amount of data to be transmitted in a remaining portion of the packet or the size of a remaining portion of the packet. At 2240, this indication of amount of data or size is compared to a threshold selected to be enforced to avoid reception of larger packets, possibly in response to the environment of the wireless device including significant Doppler effects.

If at 2240, the threshold has not been exceeded, then the wireless device continues with reception of the packet at 2250. However, if the threshold is exceeded, then the wireless device either explicitly or implicitly (depending on protocol) transmits an indication of there being an error in reception or rejection of the packet at 2242 (e.g., explicitly by transmission of a NACK packet, or implicitly by not transmitting an ACK packet), and the wireless device acts to conserve electric power by ceasing to receive any of the rest of the packet (or at least ceasing to process any of the rest of the packet).

At 2250 (presuming the threshold was not exceeded), the wireless device receives a remaining portion of the packet in which data symbols conveying command(s), indication(s) of status and/or data are conveyed, and receives shifting pilot signals (at least two) embedded among the subcarriers used to transmit the data symbols. At 2260, the wireless device uses the at least two of the shifting pilot signals for phase tracking in which any developing shift in phase from one symbol set to another is tracked as they may indicate a developing shift in phase among the data symbols of each symbol set as those data symbols are transmitted in their separate subcarriers. The wireless device uses such indications of a developing phase shift to configure its receiver to compensate for a presumably corresponding phase shift of data symbols.

At 2270, despite using the shifting pilot signals for phase tracking, the wireless device refrains from using them to derive updated channel estimates. Instead, the wireless device continues to rely on the initial channel estimate, and more particularly, on the parameter setting with which the equalizers were configured based on the initial channel estimate. At 2280, the wireless device transmits an indication of successful receipt of the packet.

Figure 8:
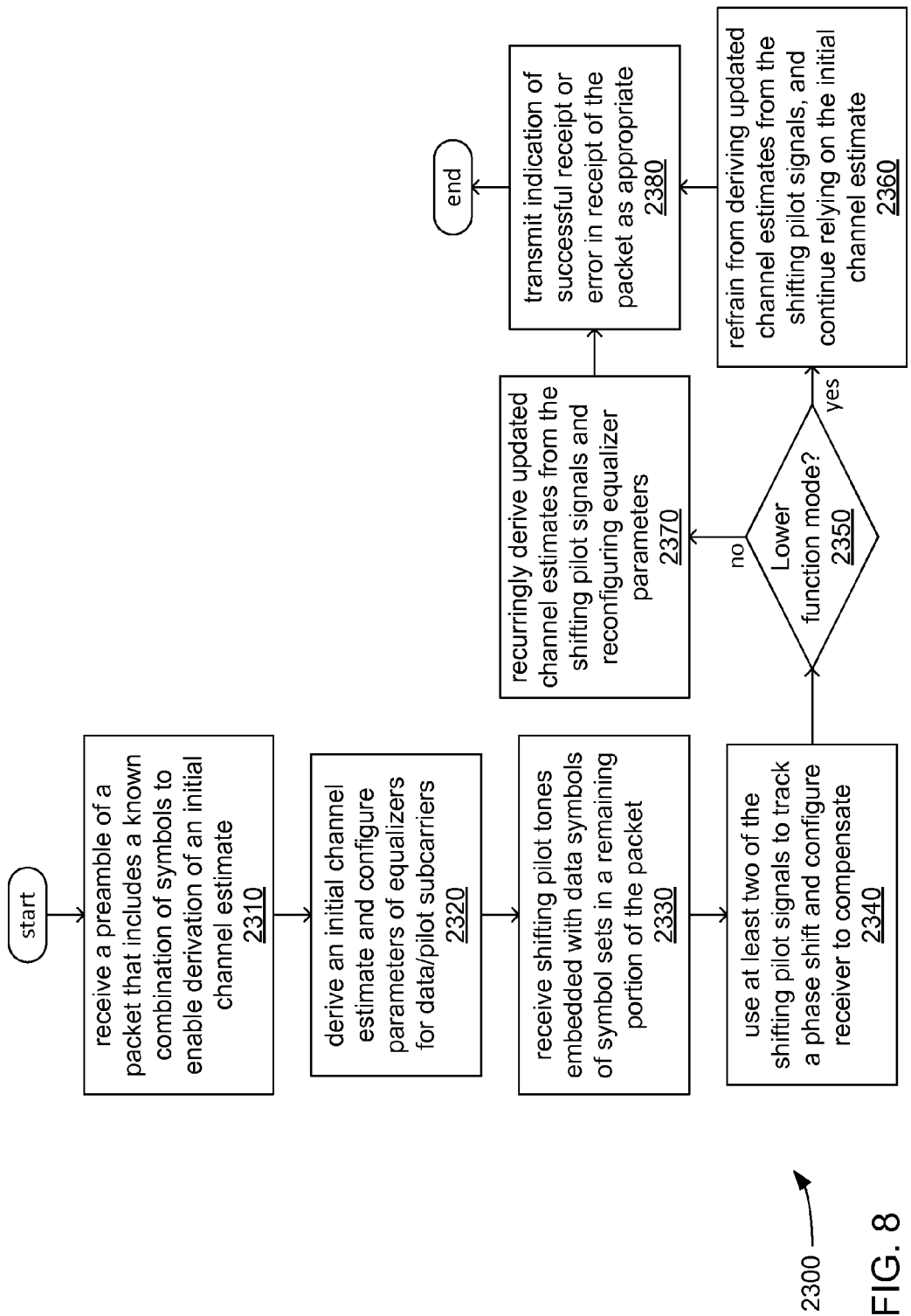
FIG. 8 illustrates an embodiment of a third logic flow.

FIG. 8 illustrates one embodiment of a logic flow 2300. The logic flow 2300 may be representative of some or all of the operations executed by one or more embodiments described herein. More specifically, the logic flow 2300 may illustrate operations performed by components of one of the wireless devices 500a-b, including at least the processor circuit 550 in executing at least the control routine 540 and/or components of the interface 590.

From 2310 to 2340, a wireless device (e.g., one of the wireless devices 500a-b) receives and responds to receipt of a packet in much the same way as just described in the logic flow 2100 of FIG. 7. The logic flows 2100 and 2200 differ starting at 2150 and 2350, respectively.

At 2350, a check is made as to whether the wireless device is operating in a lower function mode. As previously discussed, an indication of a lower function mode may be provided to a receiver (e.g., the receiver 5901) or the processor circuit (e.g., the processor circuit 550) of a wireless device by any of a variety of mechanisms, including and not limited to, storage of an indication in nonvolatile storage (e.g., a portion of the storage 560), blowing fuses and/or making other alterations made in the semiconductor processing in manufacturing the receiver or the processor circuit, pull-up or pull-down resistors, etc.

If the indication of operating a lower function mode is provided, then at 2360, the wireless device refrains from using the shifting pilot signals to derive updated channel estimates. Instead, the wireless device continues to rely on the initial channel estimate, and more particularly, on the parameter setting with which the equalizers were configured based on the initial channel estimate.

However, if there is no such indication of operating in a lower function mode, then at 2370, the wireless device proceeds with using the shifting pilot signals to derive updated channel estimates. As previously discussed, this leads to recurring updates of parameters for equalizers for at least the subcarriers on which data symbols are conveyed.

Either way, at 2380, the wireless device transmits an indication of either successful or unsuccessful receipt of the packet, as appropriate. Successful receipt depends on the outcome of error checking.

Figure 9:
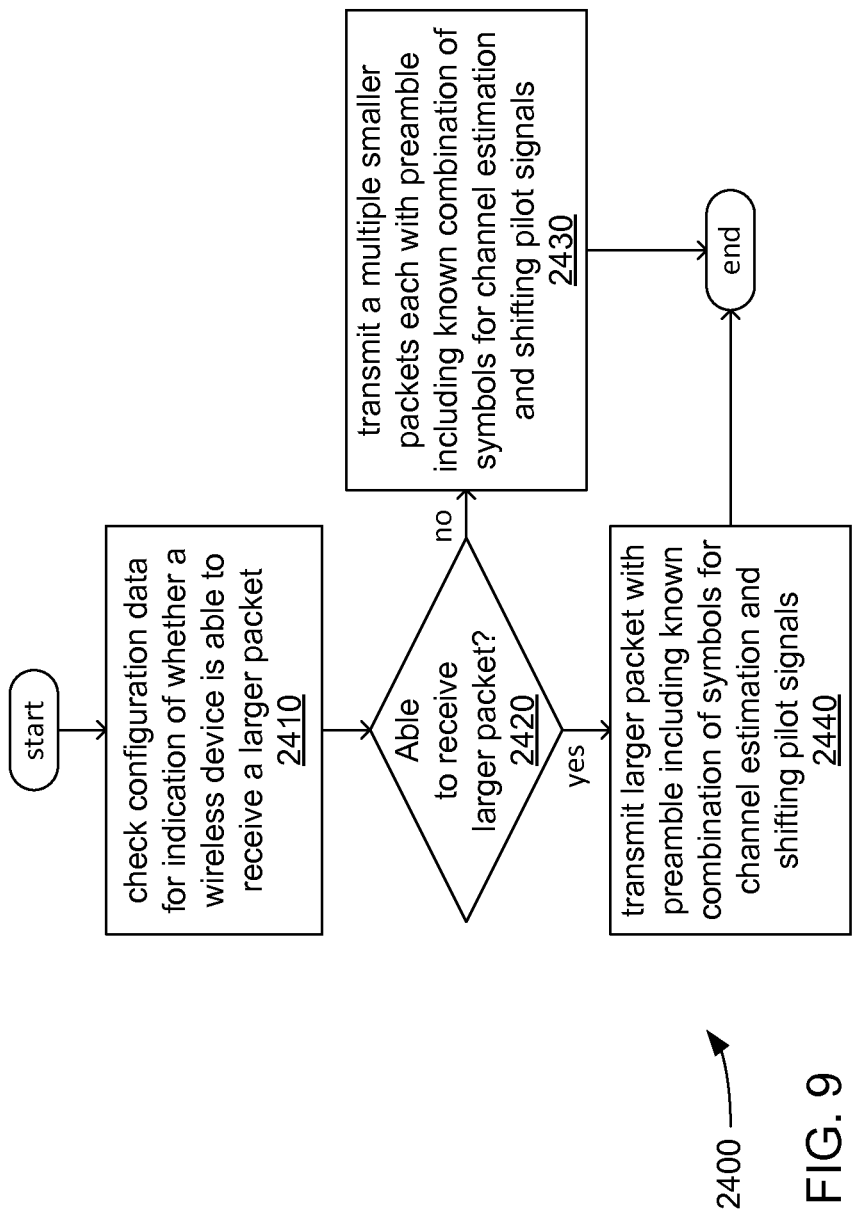
FIG. 9 illustrates an embodiment of a fourth logic flow.

FIG. 9 illustrates one embodiment of a logic flow 2400. The logic flow 2400 may be representative of some or all of the operations executed by one or more embodiments described herein. More specifically, the logic flow 2400 may illustrate operations performed by components of one of the wireless AP 100, including at least the processor circuit 150 in executing at least the control routine 140 and/or components of the interface 190.

At 2410, a wireless AP (e.g., the wireless AP 100) checks a configuration data for an indication of whether a wireless device to which it is about to transmit a larger packet is able to successfully receive larger packets. If, at 2420, the wireless device is capable of successfully receiving larger packets, then the wireless AP transmits that larger packet to that wireless device at 2440, and includes in that transmission both a preamble that includes a known combination of symbols to enable channel estimation and shifting pilot signals.

However, if the wireless device is not capable of receiving larger packets, then at 2430 then the wireless AP breaks up the data of that larger packet into multiple smaller amounts of data and transmits that data in a series of smaller packets. In its transmission of each packet, the wireless AP includes both a preamble that includes a known combination of symbols to enable channel estimation and shifting pilot signals.

Figure 10:
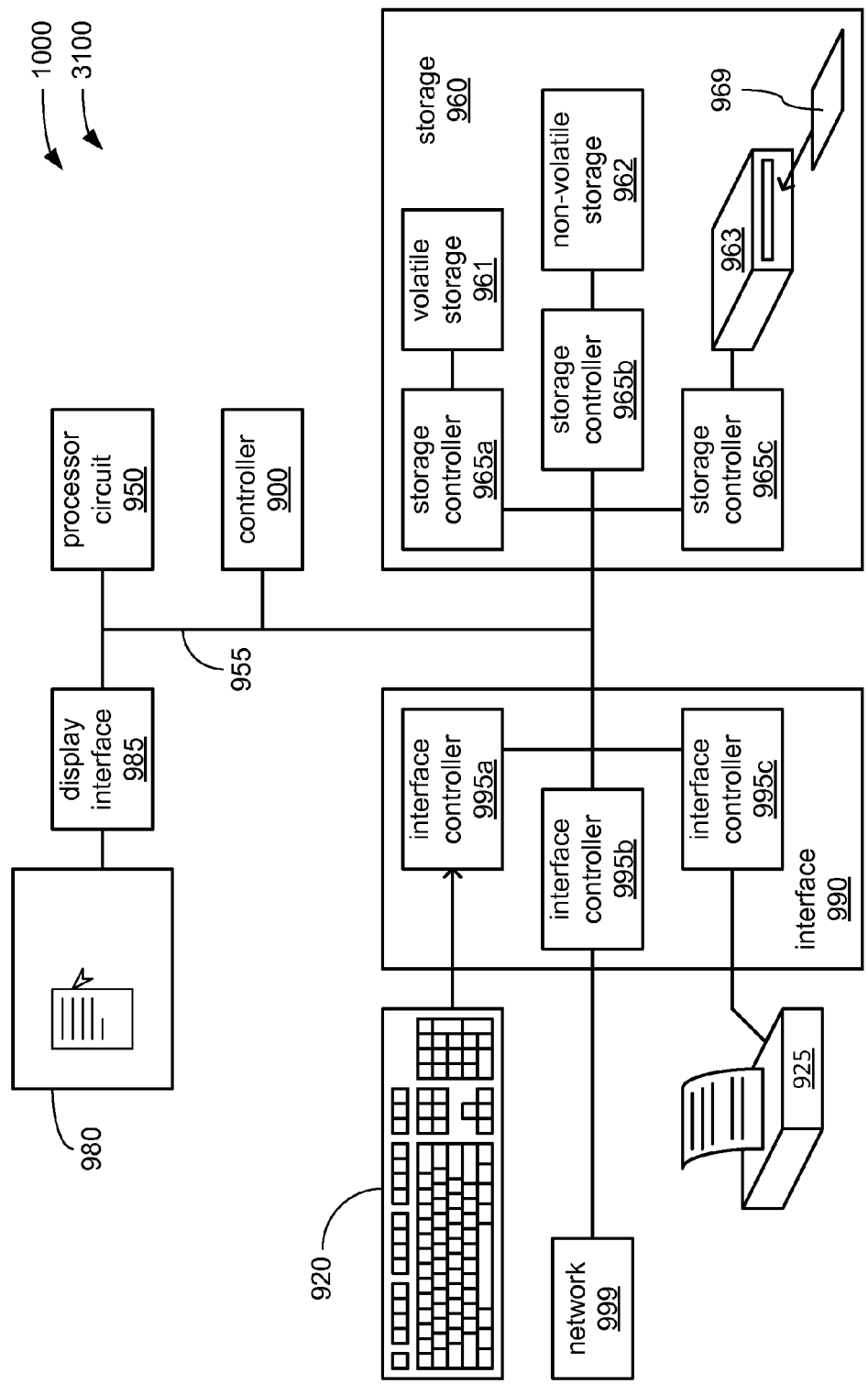
FIG. 10 illustrates an embodiment of a processing architecture.

FIG. 10 illustrates an embodiment of an exemplary processing architecture 3100 suitable for implementing various embodiments as previously described. More specifically, the processing architecture 3100 (or variants thereof) may be implemented as part of one or more of the computing devices 100, 300a-b and 500a-b. It should be noted that components of the processing architecture 3100 are given reference numbers in which the last two digits correspond to the last two digits of reference numbers of components earlier depicted and described as part of each of the computing devices 100, 300a-b and 500a-b. This is done as an aid to correlating such components of whichever ones of the computing devices 100, 300a-b and 500a-b may employ this exemplary processing architecture in various embodiments.

The processing architecture 3100 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor circuit, the processor circuit itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 3100, a computing device comprises at least a processor circuit 950, a storage 960, an interface 990 to other devices, and coupling 955. As will be explained, depending on various aspects of a computing device implementing the processing architecture 3100, including its intended use and/or conditions of use, such a computing device may further comprise additional components, such as without limitation, a controller 900.

The coupling 955 is comprised of one or more buses, point-to-point interconnects, transceivers, buffers, crosspoint switches, and/or other conductors and/or logic that communicatively couples at least the processor circuit 950 to the storage 960. The coupling 955 may further couple the processor circuit 950 to one or more of the interface 990 and the display interface 985 (depending on which of these and/or other components are also present). With the processor circuit 950 being so coupled by couplings 955, the processor circuit 950 is able to perform the various ones of the tasks described at length, above, for whichever ones of the computing devices 100, 300a-b and 500a-b implement the processing architecture 3100. The coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor circuit 950 (corresponding to one or more of the processor circuits 150, 350 and 550) may comprise any of a wide variety of commercially available processors, employing any of a wide variety of technologies and implemented with one or more cores physically combined in any of a number of ways.

As previously discussed, the storage 960 (corresponding to one or more of the storages 160, 360 and 560) may comprise one or more distinct storage devices based on any of a wide variety of technologies or combinations of technologies. More specifically, as depicted, the storage 960 may comprise one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly comprising multiple distinct types of storage is in recognition of the commonplace use of more than one type of storage device in computing devices in which one type provides relatively rapid reading and writing capabilities enabling more rapid manipulation of data by the processor circuit 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and comprises one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and comprises one or more optical and/or solid-state disk drives employing one or more pieces of removable machine-readable storage media 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage media 969.

One or the other of the volatile storage 961 or the non-volatile storage 962 may comprise an article of manufacture in the form of a machine-readable storage media on which a routine comprising a sequence of instructions executable by the processor circuit 950 may be stored, depending on the technologies on which each is based. By way of example, where the non-volatile storage 962 comprises ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to removable storage media such as a floppy diskette. By way of another example, the non-volatile storage 962 may comprise banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor circuit 950 may initially be stored on the machine-readable storage media 969, and the removable media storage 963 may be subsequently employed in copying that routine to the non-volatile storage 962 for longer term storage not requiring the continuing presence of the machine-readable storage media 969 and/or the volatile storage 961 to enable more rapid access by the processor circuit 950 as that routine is executed.

As previously discussed, the interface 990 (corresponding to one or more of the interfaces 190, 390 and 590) may employ any of a variety of signaling technologies corresponding to any of a variety of communications technologies that may be employed to communicatively couple a computing device to one or more other devices. Again, one or both of various forms of wired or wireless signaling may be employed to enable the processor circuit 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network comprising one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually comprises) a display (e.g., the depicted example display 980), such a computing device implementing the processing architecture 3100 may also comprise the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

Further, where the display interface 985 is present in a computing device implementing the processing architecture 3100, an ocular tracker 981 may also be coupled to the interface 985 to track ocular movements of at least one eye of a person viewing the display 980. Alternatively, the ocular tracker 981 may be incorporated into the computer architecture 3100 in some other manner. The ocular tracker 981 may employ any of a variety of technologies to monitor ocular movements, including and not limited to, infrared light reflection from the cornea.

More generally, the various elements of the computing devices 100, 300 and 500, may comprise various hardware elements implementing logic, software elements implementing logic, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

An example of an apparatus includes a receiver to wirelessly receive a first packet comprising a preamble comprising a known combination of symbols and a data portion comprising two shifting pilot signals among data symbols transmitted via multiple subcarriers in symbol sets; and logic to use reception of the known combination to detect characteristics of each subcarrier of the multiple subcarriers to derive an initial channel estimate, configure the receiver using the initial channel estimate to compensate for the detected characteristics, use the two shifting pilot signals to track a phase shift, configure the receiver to compensate for the shift in phase, and refrain from using reception of the shifting pilot signals to update the initial channel estimate.

The above example of an apparatus in which the logic is to receive an indication of the receiver operating in a lower function mode, and condition use of reception of the shifting pilot signals to update the initial channel estimate on the indication of operating in a lower function mode.

Either of the above examples of an apparatus in which the logic is to track the phase shift using the two shifting pilot signals only when neither shifting pilot signal of the two shifting pilot signals is transmitted in a subcarrier of the multiple subcarriers that is adjacent to either a group subcarrier or a DC subcarrier.

Any of the above examples of an apparatus in which the apparatus includes a transmitter, and the logic is to perform recurring error checks of the data symbols as the data symbols are received and operate the transmitter to transmit an indication of an error based on the recurring error checks.

Any of the above examples of an apparatus in which the apparatus includes a transmitter, and the logic is to receive an indication of an amount of data to be received or a size of a remaining portion of the first packet to be received and operate the transmitter to transmit an indication of an error in reception of the first packet based on the indication of the amount of data or the size of the remaining portion exceeding a selected threshold.

Any of the above examples of an apparatus in which the apparatus includes a transmitter and a sensor, and the logic is to recurringly monitor the sensor for a detected event and operate the transmitter to transmit a second packet to convey an indication of the detected event based on detection of the detected event.

An example of another apparatus includes a receiver to wirelessly receive a first packet comprising first and second shifting pilot signals amidst first data symbols transmitted via multiple subcarriers in symbol sets; a transmitter to wireless transmit a second packet; and logic to track a shift in phase using the first and second shifting pilot signals, configure the receiver to compensate for the shift in phase, refrain from using reception of the first and second shifting pilot signals to update an initial channel estimate derived from a preamble of the first packet, and transmit third and fourth shifting pilot signals amidst second data symbols of the second packet.

The above example of another apparatus in which the receiver is to receive a first preamble with the first packet, the first preamble comprising a known combination of symbols; and the logic is to use reception of the known combination to detect characteristics of each subcarrier of the multiple subcarriers to derive an initial channel estimate, and configure the receiver using the initial channel estimate to compensate for the detected characteristics.

Either of the above examples of another apparatus in which the logic is to transmit a second preamble comprising the known combination of symbols in the second packet ahead of the second data symbols.

Any of the above examples of another apparatus in which the logic is to track the phase shift using the first and second shifting pilot signals only when neither of the first and second shifting pilot signals is transmitted in a subcarrier of the multiple subcarriers that is adjacent to either a group subcarrier or a DC subcarrier.

Any of the above examples of another apparatus in which the logic is to perform recurring error checks of the first data symbols as the first data symbols are received, and operate the transmitter to transmit an indication of an error based on the recurring error checks.

Any of the above examples of another apparatus in which the logic is to receive an indication of an amount of data to be received or a size of a remaining portion of the first packet to be received, and operate the transmitter to transmit an indication of an error in reception of the first packet based on the indication of the amount of data or the size of the remaining portion exceeding a selected threshold.

Any of the above examples of another apparatus in which the apparatus includes a sensor; and the logic is to recurringly monitor the sensor for a detected event, and operate the transmitter to transmit the second packet based on detection of the detected event, the second data symbols conveying an indication of the detected event.

Any of the above examples of another apparatus in which the receiver is configured to be incapable of using reception of the first and second shifting pilot signals to update the initial channel estimate.

Any of the above examples of another apparatus in which the apparatus includes a storage to store instructions and a processor circuit to execute the instructions to implement the logic, and at least one antenna coupled to at least one of the receiver and the transmitter.

An example of a computer-implemented method includes use reception of a known combination of symbols in a preamble of a received first packet to detect characteristics of each subcarrier of multiple subcarriers used in the first packet to transmit data symbols to derive an initial channel estimate; configure a receiver receiving the first packet using the initial channel estimate to compensate for the detected characteristics; track a phase shift using two shifting pilot signals of the first data packet amidst the data symbols; configure the receiver to compensate for the shift in phase; refrain from using reception of the shifting pilot signals to update the initial channel estimate; and transmit an indication to a wireless access point of an inability to successfully receive larger packets.

The above example of a computer-implemented method in which the method includes tracking a phase shift using the two shifting pilot signals when neither shifting pilot signal of the two shifting pilot signals is transmitted in a subcarrier of the multiple subcarriers that is adjacent to either a group subcarrier or a DC subcarrier.

Either of the above examples of a computer-implemented method in which the method includes performing recurring error checks of the data symbols as the data symbols are received; and transmitting an indication of an error based on the recurring error checks as the indication of an inability to successfully receive larger packets.

Any of the above examples of a computer-implemented method in which the method includes receiving an indication of an amount of data to be received or a size of a remaining portion of the first packet to be received, and transmitting an indication of an error in reception of the first packet based on the indication of the amount of data or the size of the remaining portion exceeding a selected threshold.

Any of the above examples of a computer-implemented method in which the method includes recurringly monitoring a sensor for a detected event, and operating the transmitter to transmit a second packet to convey an indication of the detected event based on detection of the detected event.

An example of at least one machine-readable storage medium includes instructions that when executed by a computing device, cause the computing device to track a phase shift using first and second shifting pilot signals of a first packet received by a receiver of the computing device, the first packet conveying the first and second shifting pilot signals amidst first data symbols transmitted via multiple subcarriers in symbol sets; configure the receiver to compensate for the shift in phase; refrain from using reception of the first and second shifting pilot signals to update an initial channel estimate derived from a preamble of the first packet; monitor a sensor of the computing device for a detected event; and transmit a second packet comprising third and fourth shifting pilot signals amidst second data symbols conveying an indication of the detected event.

The above example of at least one machine-readable storage medium in which the computing device is caused to receive a first preamble with the first packet, the first preamble comprising a known combination of symbols; use reception of the known combination to detect characteristics of each subcarrier of the multiple subcarriers to derive an initial channel estimate; and configure the receiver using the initial channel estimate to compensate for the detected characteristics.

Either of the above examples of at least one machine-readable storage medium in which the computing device is caused to transmit a second preamble comprising the known combination of symbols in the second packet ahead of the second data symbols.

Any of the above examples of at least one machine-readable storage medium in which the computing device is caused to track a phase shift using the first and second shifting pilot signals only when neither of the first and second shifting pilot signals is transmitted in a subcarrier of the multiple subcarriers that is adjacent to either a group subcarrier or a DC subcarrier.

Any of the above examples of at least one machine-readable storage medium in which the computing device is caused to perform recurring error checks of the first data symbols as the first data symbols are received, and transmit an indication of an error based on the recurring error checks.

Any of the above examples of at least one machine-readable storage medium in which the computing device is caused to receive an indication of an amount of data to be received or a size of a remaining portion of the first packet to be received, and transmit an indication of an error in reception of the first packet based on the indication of the amount of data or the size of the remaining portion exceeding a selected threshold.

The invention claimed is:

1. An apparatus comprising:
   a receiver to wirelessly receive a first packet comprising a preamble comprising a known combination of symbols and a data portion comprising two shifting pilot signals among data symbols transmitted via multiple subcarriers in symbol sets; and
   logic to:
   use reception of the known combination to detect characteristics of each subcarrier of the multiple subcarriers to derive an initial channel estimate;
   configure the receiver using the initial channel estimate to compensate for the detected characteristics;
   use the two shifting pilot signals to track a phase shift;
   configure the receiver to compensate for the shift in phase; and
   refrain from using reception of the shifting pilot signals to update the initial channel estimate.

2. The apparatus of claim 1, the logic to:
   receive an indication of the receiver operating in a lower function mode; and
   condition use of reception of the shifting pilot signals to update the initial channel estimate on the indication of operating in a lower function mode.

3. The apparatus of claim 1, the logic to track the phase shift using the two shifting pilot signals only when neither shifting pilot signal of the two shifting pilot signals is transmitted in a subcarrier of the multiple subcarriers that is adjacent to either a group subcarrier or a DC subcarrier.

4. The apparatus of claim 1, the apparatus comprising a transmitter, the logic to:
   perform recurring error checks of the data symbols as the data symbols are received; and
   operate a transmitter to transmit an indication of an error based on the recurring error checks.

5. The apparatus of claim 1, the apparatus comprising a transmitter, the logic to:
   receive an indication of an amount of data to be received or a size of a remaining portion of the first packet to be received; and
   operate a transmitter to transmit an indication of an error in reception of the first packet based on the indication of the amount of data or the size of the remaining portion exceeding a selected threshold.

6. The apparatus of claim 1, the apparatus comprising a transmitter and a sensor, the logic to:
   recurringly monitor the sensor for a detected event; and
   operate a transmitter to transmit a second packet to convey an indication of the detected event based on detection of the detected event.

7. An apparatus comprising:
   a receiver to wirelessly receive a first packet comprising first and second shifting pilot signals amidst first data symbols transmitted via multiple subcarriers in symbol sets;
   a transmitter to wireless transmit a second packet; and
   logic to:
   track a shift in phase using the first and second shifting pilot signals;
   configure the receiver to compensate for the shift in phase;
   refrain from using reception of the first and second shifting pilot signals to update an initial channel estimate derived from a preamble of the first packet; and
   transmit third and fourth shifting pilot signals amidst second data symbols of the second packet.

8. The apparatus of claim 7, the receiver to receive a first preamble with the first packet, the first preamble comprising a known combination of symbols, the logic to:

use reception of the known combination to detect characteristics of each subcarrier of the multiple subcarriers to derive an initial channel estimate; and
configure the receiver using the initial channel estimate to compensate for the detected characteristics.

9. The apparatus of claim 8, the logic to transmit a second preamble comprising the known combination of symbols in the second packet ahead of the second data symbols.

10. The apparatus of claim 7, the logic to track the phase shift using the first and second shifting pilot signals only when neither of the first and second shifting pilot signals is transmitted in a subcarrier of the multiple subcarriers that is adjacent to either a group subcarrier or a DC subcarrier.

11. The apparatus of claim 7, the logic to:
perform recurring error checks of the first data symbols as the first data symbols are received; and
operate the transmitter to transmit an indication of an error based on the recurring error checks.

12. The apparatus of claim 7, the logic to:
receive an indication of an amount of data to be received or a size of a remaining portion of the first packet to be received; and
operate the transmitter to transmit an indication of an error in reception of the first packet based on the indication of the amount of data or the size of the remaining portion exceeding a selected threshold.

13. The apparatus of claim 7, the apparatus comprising a sensor, the logic to:
recurringly monitor the sensor for a detected event; and
operate the transmitter to transmit the second packet based on detection of the detected event, the second data symbols conveying an indication of the detected event.

14. The apparatus of claim 7, the receiver configured to be incapable of using reception of the first and second shifting pilot signals to update the initial channel estimate.

15. The apparatus of claim 7, comprising:
a storage to store instructions and a processor circuit to execute the instructions to implement the logic; and
at least one antenna coupled to at least one of the receiver and the transmitter.

16. A method comprising:
using, by processing circuitry, reception of a known combination of symbols in a preamble of a received first packet to detect characteristics of each subcarrier of multiple subcarriers used in the first packet to transmit data symbols to derive an initial channel estimate;
configuring, by processor circuitry, a receiver receiving the first packet using the initial channel estimate to compensate for the detected characteristics;
tracking, by processing circuitry, a phase shift using two shifting pilot signals of the first data packet amidst the data symbols;
configuring, by processing circuitry, the receiver to compensate for the shift in phase;
refraining, by the processing circuitry, from using reception of the shifting pilot signals to update the initial channel estimate; and
transmitting, by a transmitter, an indication to a wireless access point of an inability to successfully receive larger packets.

17. The computer-implemented method of claim 16, comprising tracking, by processing circuitry, a phase shift using the two shifting pilot signals when neither shifting pilot signal of the two shifting pilot signals is transmitted in a subcarrier of the multiple subcarriers that is adjacent to either a group subcarrier or a DC subcarrier.

18. The computer-implemented method of claim 16, comprising:
performing, by processing circuitry, recurring error checks of the data symbols as the data symbols are received; and
transmitting, by a transmitter, an indication of an error based on the recurring error checks as the indication of an inability to successfully receive larger packets.

19. The computer-implemented method of claim 16, comprising:
receiving, by processing circuitry, an indication of an amount of data to be received or a size of a remaining portion of the first packet to be received; and
transmitting, by a transmitter, an indication of an error in reception of the first packet based on the indication of the amount of data or the size of the remaining portion exceeding a selected threshold.

20. The computer-implemented method of claim 16, comprising:
recurringly monitoring, by processing circuitry, a sensor for a detected event; and
operating, by processing circuitry, a transmitter to transmit a second packet to convey an indication of the detected event based on detection of the detected event.

21. A non-transitory machine-readable storage medium comprising instructions that when executed by a computing device, cause the computing device to:
track a phase shift using first and second shifting pilot signals of a first packet received by a receiver of the computing device, the first packet conveying the first and second shifting pilot signals amidst first data symbols transmitted via multiple subcarriers in symbol sets;
configure the receiver to compensate for the shift in phase;
refrain from using reception of the first and second shifting pilot signals to update an initial channel estimate derived from a preamble of the first packet;
monitor a sensor of the computing device for a detected event; and
transmit a second packet comprising third and fourth shifting pilot signals amidst second data symbols conveying an indication of the detected event.

22. The non-transitory machine-readable storage medium of claim 21, the computing device caused to:
receive a first preamble with the first packet, the first preamble comprising a known combination of symbols;
use reception of the known combination to detect characteristics of each subcarrier of the multiple subcarriers to derive an initial channel estimate; and
configure the receiver using the initial channel estimate to compensate for the detected characteristics.

23. The non-transitory machine-readable storage medium of claim 22, the computing device caused to transmit a second preamble comprising the known combination of symbols in the second packet ahead of the second data symbols.

24. The non-transitory machine-readable storage medium of claim 21, the computing device caused to track a phase shift using the first and second shifting pilot signals only when neither of the first and second shifting pilot signals is transmitted in a subcarrier of the multiple subcarriers that is adjacent to either a group subcarrier or a DC subcarrier.

25. The non-transitory machine-readable storage medium of claim 21, the computing device caused to:
perform recurring error checks of the first data symbols as the first data symbols are received; and
transmit an indication of an error based on the recurring error checks.

26. The non-transitory machine-readable storage medium of claim 21, the computing device caused to:

receive an indication of an amount of data to be received or a size of a remaining portion of the first packet to be received; and transmit an indication of an error in reception of the first packet based on the indication of the amount of data or the size of the remaining portion exceeding a selected threshold.

\* \* \* \* \*

UNITED STATES PATENT AND TRADEMARK OFFICE
CERTIFICATE OF CORRECTION

PATENT NO. : 8,848,841 B2  Page 1 of 1
APPLICATION NO. : 13/728464
DATED : September 30, 2014
INVENTOR(S) : Azizi et al.

It is certified that error appears in the above-identified patent and that said Letters Patent is hereby corrected as shown below:

In the Drawings

On sheet 4 of 11, in Figure 3, reference numeral 149, line 2, delete "compononent" and insert -- component --, therefor.

On sheet 5 of 11, in Figure 4, reference numeral 349, line 2, delete "compononent" and insert -- component --, therefor.

On sheet 6 of 11, in Figure 5, reference numeral 549, line 2, delete "compononent" and insert -- component --, therefor.

Signed and Sealed this
Second Day of June, 2015

Michelle K. Lee
*Director of the United States Patent and Trademark Office*